US012512033B2

(12) United States Patent
Kim et al.

(10) Patent No.: US 12,512,033 B2
(45) Date of Patent: Dec. 30, 2025

(54) SYSTEMS AND METHODS FOR BRIGHTNESS OR COLOR CONTROL IN ELECTRONIC DISPLAYS

(71) Applicant: Apple Inc., Cupertino, CA (US)

(72) Inventors: Hyunsoo Kim, San Diego, CA (US); Hyunwoo Nho, Palo Alto, CA (US); Hoon Sik Kim, Los Gatos, CA (US); Shatam Agarwal, San Jose, CA (US); Mahdi Farrokh Baroughi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/735,843

(22) Filed: May 3, 2022

(65) Prior Publication Data

US 2022/0375388 A1 Nov. 24, 2022

Related U.S. Application Data

(60) Provisional application No. 63/190,624, filed on May 19, 2021.

(51) Int. Cl.
*G09G 3/20* (2006.01)
*G09G 3/00* (2006.01)

(52) U.S. Cl.
CPC .......... *G09G 3/2018* (2013.01); *G09G 3/035* (2020.08); *G09G 2320/0285* (2013.01); *G09G 2320/0666* (2013.01); *G09G 2320/0673* (2013.01); *G09G 2320/0686* (2013.01); *G09G 2354/00* (2013.01); *G09G 2360/144* (2013.01)

(58) Field of Classification Search
CPC ................ G09G 3/2018; G09G 3/035; G09G 2320/0285; G09G 2320/0666; G09G 2320/0673; G09G 2320/0686; G09G 2354/00; G09G 2360/144
See application file for complete search history.

(56) References Cited

U.S. PATENT DOCUMENTS

| | | | | |
|---|---|---|---|---|
| 2007/0211013 A1* | 9/2007 | Uehara | G09G 3/3413 345/102 |
| 2021/0201733 A1* | 7/2021 | Lee | G09G 3/20 |
| 2022/0122500 A1* | 4/2022 | Wai | G09G 3/2014 |
| 2022/0283608 A1* | 9/2022 | Xianyu | G06F 1/1641 |
| 2022/0415227 A1* | 12/2022 | Cho | H04M 1/0237 |

FOREIGN PATENT DOCUMENTS

| | | | | |
|---|---|---|---|---|
| WO | 2020/169036 A1 | 8/2020 | |
| WO | WO-2021043143 A1 * | 3/2021 | G09G 3/035 |

OTHER PUBLICATIONS

Partial Search Report & Invitation to Pay Additional Fees for PCT/US2022/029924 dated Aug. 8, 2022; 25 pgs.

* cited by examiner

*Primary Examiner* — Xin Sheng
(74) *Attorney, Agent, or Firm* — Fletcher Yoder, P.C.

(57) ABSTRACT

The present disclosure relates to systems and methods to control brightness and color output in foldable displays. A foldable electronic display may, when folded, includes a first part in a first plane and a second part in a second plane different from the first plane. A brightness or color setting of the first part may be controlled independently of a brightness or color setting of the second part.

23 Claims, 24 Drawing Sheets

SYSTEMS AND METHODS FOR BRIGHTNESS OR COLOR CONTROL IN ELECTRONIC DISPLAYS

CROSS-REFERENCE TO RELATED APPLICATIONS

This application claims priority from and the benefit of U.S. Provisional Application Ser. No. 63/190,624, entitled "Systems and Methods for Brightness or Color Control in Foldable Displays," filed May 19, 2021, which is hereby incorporated by reference in its entirety for all purposes.

SUMMARY

This disclosure relates to systems and methods for brightness or color control for a foldable display to mitigate image artifacts due to viewing conditions of different areas of the foldable display.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

Electronic displays may take the form of foldable displays. Foldable displays may fold or roll up to take a variety of shapes. For example, some foldable displays may have a hinged region where two areas of the foldable display can fold inwards and/or outwards. This may give a foldable display capabilities not possible for a flat display. For instance, foldable displays, when in a folded state, may utilize the top half of the display to display media content (e.g., mobile applications, videos, websites) and utilize the bottom half of the display as an input medium (e.g., keyboard or trackpad), to display a logo, to display date and time information, or to display other information.

If a foldable display utilizes a constant brightness setting for the entire display regardless of whether the display is folded, different areas of the folded display may have different normal (perpendicular) axes of light emission. That is, one area of the folded display may be folded to point toward a person's eyes while another area is not. In some types of displays, the apparent luminance of the display will depend on the angle of emission, relative to the display normal direction (perpendicular to the display surface). In these cases, the "on-axis" light emission that is emitted in a normal direction can be noticeably different than "off-axis" light emission at some other angle (e.g., 45°). In a display that is not flat, a person may see more light coming from the area of the folded display that is folded to point toward a person's eyes, even if both areas of the folded display have the same amount of on-axis light emission. This may affect not just the brightness, but also the color, viewed from the different areas of the folded display. This is because different color components (e.g., red, green, or blue display pixels) may emit more or less light off-axis in relation to on-axis. The difference in brightness or color between two folded areas of the foldable display could produce an image artifact, as the user expects reasonably constant viewing characteristics. Viewing the foldable display in a dark room or low-light setting could amplify this effect. Thus, the ability to adjust the brightness of foldable displays can enable an improved viewing experience for the user and provide a power saving benefit.

To reduce power emission and adjust brightness of the foldable display, the foldable display may implement separate brightness control algorithms and/or driving architecture for different portions of the display, such as each half of the display for a display that folds in the middle. For example, when a display is folded the top half of the display may display media content and the bottom half of the display may function as a keyboard or other input medium. Under some conditions, particularly during low light conditions, display viewing experience may be impacted. The display may implement different special modes (e.g., pre-adjusted or dynamically adjusted settings based on environmental conditions) for different folded areas of the display (e.g., when the folded display is folded in half, each half of the folded display may have different settings), to aid in ease of viewing experience. For example, during a low-light or nighttime scenario, the display may apply a color shift mode (e.g., Night Shift® by Apple Inc.) that involves dimming down blue light for the top half of the display.

As noted above, the color and luminance of the foldable display relative to the viewer may also be altered based on viewing angle and viewer eye position. This can lead to a lower quality viewing experience for the user based on fold angle of the display and/or the viewer's eye position relative to the display. The ability of eye position to be tracked and/or determined can enable foldable displays to dynamically adjust luminance and color output to enable an optimal viewing experience for the user. In one example, the eye position relative to the display may be determined by a camera, proxy sensor, a face recognition system (e.g., Face ID® by Apple Inc.), folding angle of the display, or any other eye tracking method. The luminance and/or color of the display may then be adjusted utilizing an algorithm taking into account fold angle and viewer eye position to adjust for optimal viewing conditions. The luminance and color of the foldable display may also be adjusted by the system by utilizing fold angle data and an estimated eye position in situations where an eye tracker component is not available.

BRIEF DESCRIPTION OF THE DRAWINGS

Various aspects of this disclosure may be better understood upon reading the following detailed description and upon reference to the drawings described below.

DETAILED DESCRIPTION

Figure 1:
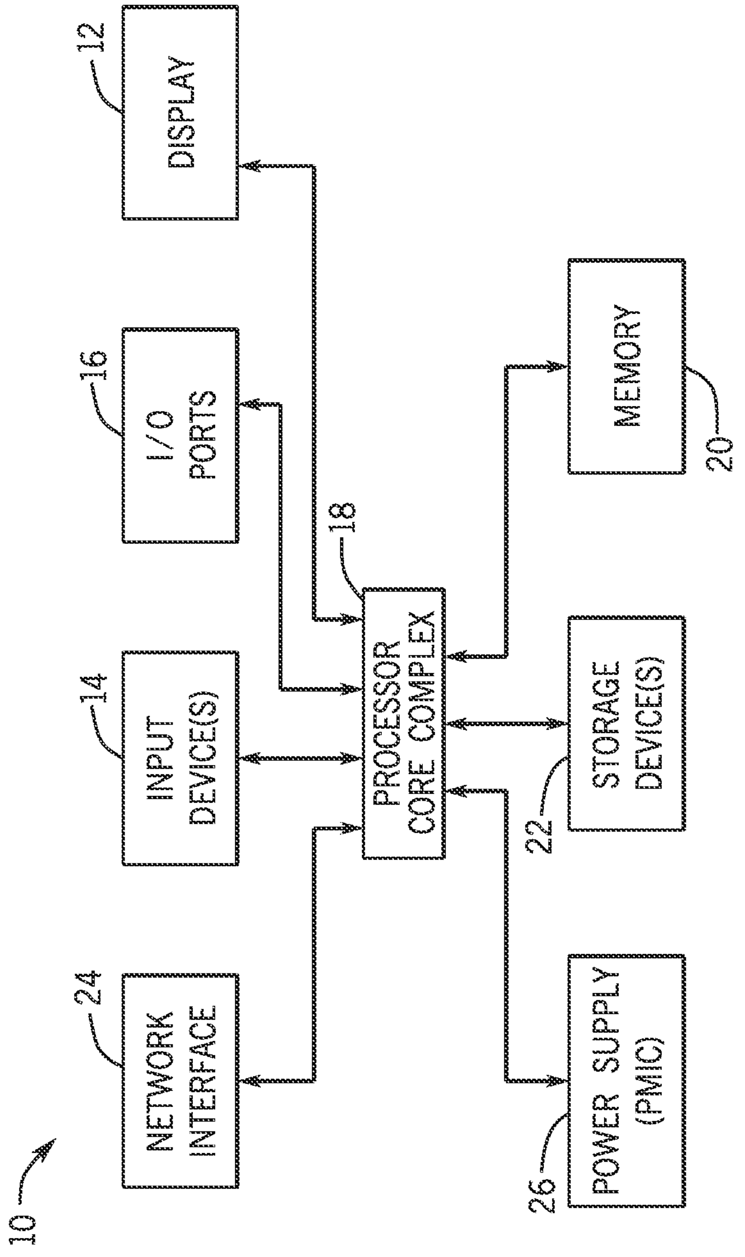
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to foldable electronic displays that implement separate brightness control algorithms and/or driving architecture for different folded sections of the display, such as each half of the display. As mentioned above, foldable electronic displays may be found in numerous electronic devices, from mobile phones to computers. To save power, an electronic display may adjust brightness of different areas of the electronic display (e.g., top half and bottom half) independently when the display is folded. Brightness settings for each part of the display may be adjusted when the display is folded. For example, the bottom half of the display may no longer be in use to display media content (e.g., applications, games, videos, messages) and in contrast may be used as an input medium or to display minimal date and time information. In this example, the brightness of the bottom half of the display may be adjusted to a lower brightness setting to improve the user viewing experience and enable power saving benefits. The ability to adjust display brightness may be facilitated through the use of pulse width modulation (PWM) control for the top half and bottom half of the display. This separate control may be facilitated by implementing dual emission (EM) gate-in-panel (GIP) rails on the left side and the right side of the Display Driver Integrated Circuitry (DIC). Each of the GIP rails output emission (EM) signals sent to the top half and the bottom half of the display respectively. In one example, the GIP rails on the right side may control the EM waveform signal sent to the top half of the display and the GIP rails on the left side may control the EM waveform signal sent to the bottom half of the display. In this way, the top and bottom half of the display can be sent different EM waveform operations depending on desired brightness.

The ability to adjust brightness may also be accomplished by utilizing digital dimming methods that involve adjusting and scaling image data sent to each half of the display panel. This method may be implemented using look-up tables (LUTs) to control top half and bottom half display brightness. The DIC may receive input gray levels (e.g., image brightness levels) for the image to be displayed. The input gray levels for the top half of the display are sent to a LUT to be scaled according to desired values. The LUT may have a specific display brightness value (DBV) flag that enables the LUT to scale the brightness to a desired global brightness level for the top half of the display by outputting adjusted gray values corresponding to the DBV flag for the top half display LUT. The input gray levels for the bottom half of the display are sent to a separate LUT with a DBV flag that is able to scale the brightness to the desired global brightness level for the bottom half of the display by outputting adjusted gray values corresponding to the bottom DBV flag for the bottom half display LUT. The output gray values corresponding to desired brightnesses for the top half and bottom half of the display may then be sent through the DIC to the display panel enabling brightness level of the top half of the display to be scaled separately from the bottom half of the display.

The foldable display may also implement special modes (e.g., Night Shift® and True Tone® modes by Apple Inc.) based on environmental conditions by adjusting and scaling the programming signals directed to each half of the display separately according to these conditions. For example, modes such as True Tone® mode by Apple Inc. may cause a white point to more closely match current environmental lighting conditions. Modes such as Night Shift® may, in a low light environment, reduce user eye fatigue. It may be desired that a mode such as Night Shift® only be applied to media content while the bottom half of the display may be maintained at a normal setting. The color output may be adjusted in the top half of the foldable display by adjusting white balance for the top half of the display and the bottom half of the display independently. This can be accomplished in a similar method to the digital dimming method demonstrated above. The input gray values may be scaled using separate LUTs for the top half and the bottom half of the image. These LUTs may apply different special mode flags to adjust the white balance that result from the LUTs. The white balanced image data may result in programming signals (e.g., output voltages) adjusted for each half of the display that may be sent by the DIC to the panel so that the color adjusted image may be displayed.

The disclosure also relates to display color and luminance compensation based on user viewing angle. Foldable displays are often susceptible to color and luminance variation as a result of different user viewing angles. In some embodiments the display can be manually calibrated, and the user can manually set the color and luminance of the top half and bottom half of the display independently by utilizing user controls of the display. In other embodiments, the luminance and color of the display may be automatically calibrated based on eye position tracked via camera, proxy sensor, facial recognition (e.g., Face ID® by Apple Inc.), or other method. The folding angle of the display may be determined by internal sensors within the display, sensitive to the relative angle of the display sections. The user eye position in combination with the folding angle of the display may be implemented to calculate a target luminance for the sub-pixels that each control a luminance of one color component (e.g., red, green, or blue for an RGB pixel arrangement). The target RGB pixel luminance for all pixels of the display is then implemented via the DIC. In other embodiments, the color and luminance of the display may be compensated based on folding angle alone and utilizing stored possible user eye regions. A best match for target RGB luminance may be determined based on the possible view locations within the stored eye regions.

With this in mind, an example of an electronic device 10, which includes a foldable electronic display 12 that may benefit from these features, is shown in FIG. 1. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to the foldable electronic display 12, as depicted, the electronic device 10 includes one or more input devices 14, one or more input/output (110) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the foldable electronic display 12.

The foldable electronic display 12 may take the form of a multiple fold display that includes one or more folds, such that the folded sections may be equal in area and/or different in area. The one or more folds may enable the foldable electronic display 12 to be arranged in multiple configurations. For example, the foldable electronic display 12 may include one or more folds and may be configured to be folded into two sections of equal and/or different area at a single fold or folded into multiple sections of equal and/or different areas at multiple folds of the foldable electronic display 12. The foldable electronic display 12, in some embodiments may be a flexible display that enables arrangement of the display in a bent and/or rollable configuration. The foldable electronic display 12, in a flexible display embodiment may be rolled or bent at any section of the foldable electronic display 12 and may enable multiple configurations.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the foldable electronic display 12. The touch sensing components may receive user inputs by detecting occurrence and/or position of an object contacting the display surface of the foldable electronic display 12.

In addition to enabling user inputs, the foldable electronic display 12 may facilitate providing visual representations of information by displaying one or more images (e.g., image frames or pictures). For example, the foldable electronic display 12 may display a graphical user interface (GUI) of an operating system, an application interface, text, a still image, or video content. To facilitate displaying images, the foldable electronic display 12 may include a display panel with one or more display pixels. The display pixels may represent sub-pixels that each control a luminance of one color component (e.g., red, green, or blue for an RGB pixel arrangement).

The foldable electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage 22. Additionally, in some embodiments, image data may be received from another electronic device 10, for example, via the network interface 24 and/or an I/O port 16.

Figure 2:
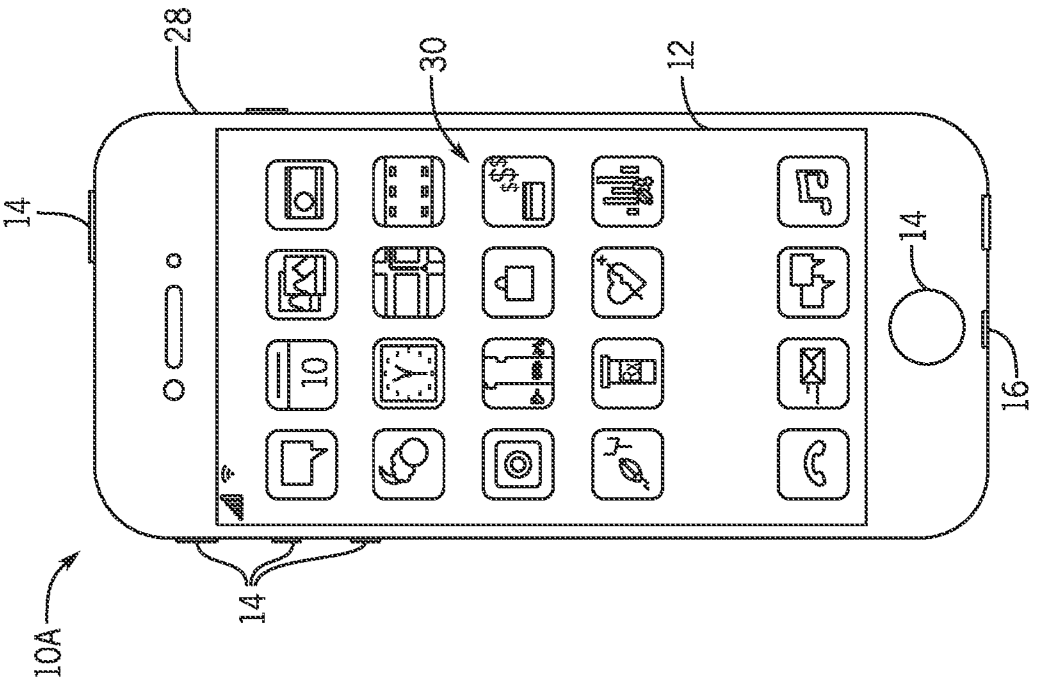
FIG. 2 is a front view of a mobile phone representing an example of the electronic device of FIG. 1, in accordance with an embodiment.

One example of the electronic device 10, specifically a handheld device 10A, is shown in FIG. 2. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 28 (e.g., housing). The enclosure 28 may protect interior components from physical damage and/or shield them from electromagnetic interference. In the depicted embodiment, the foldable electronic display 12 is displaying a graphical user interface (GUI) 30 having an array of icons 32. By way of example, when an icon 32 is selected either by an input device 14 or a touch sensing component of the foldable electronic display 12, an application program may launch.

Input devices 14 may be provided through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 28. The I/O ports 16 may include, for example, a Lightning® or Universal Serial Bus (USB) port.

Figure 3:
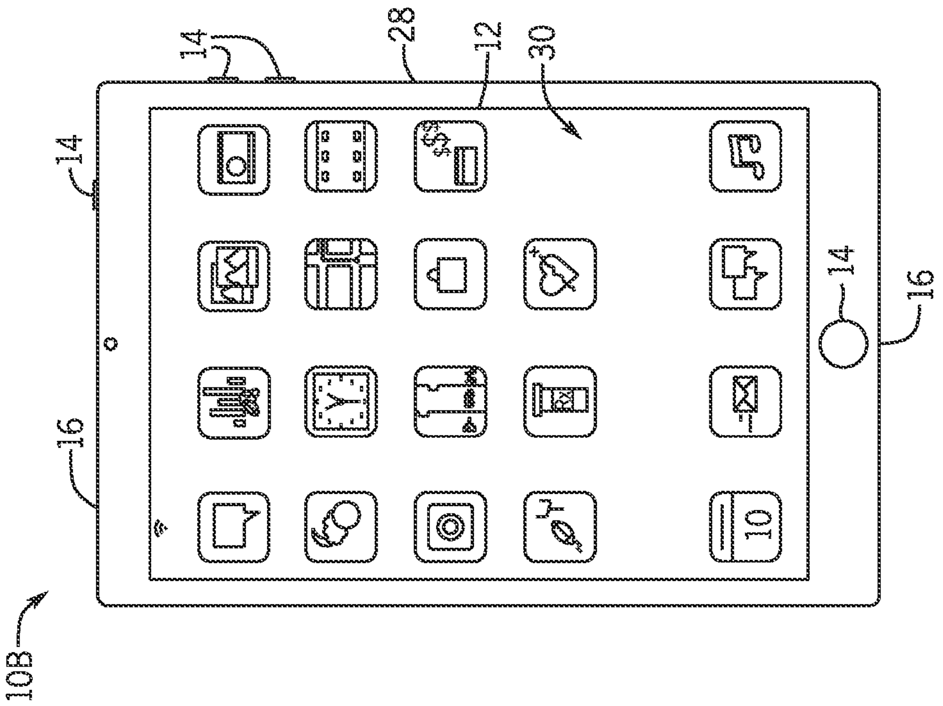
FIG. 3 is a front view of a tablet device representing an example of the electronic device of FIG. 1, in accordance with an embodiment.
Figure 4:
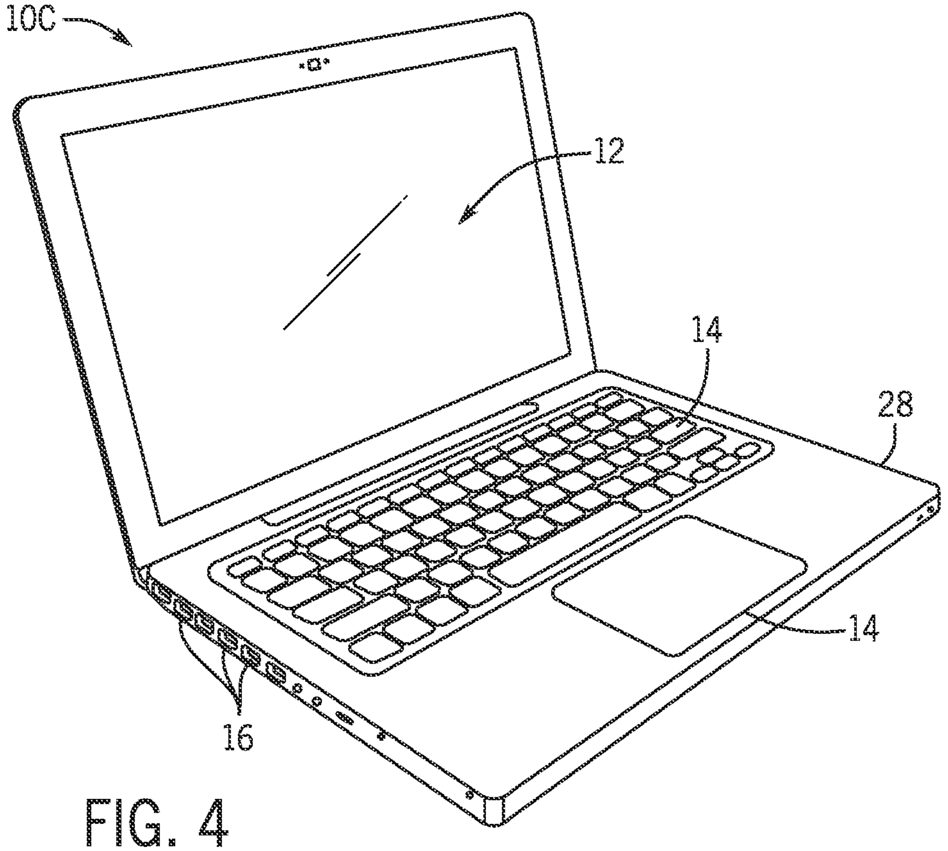
FIG. 4 is a front view of a notebook computer representing an example of the electronic device of FIG. 1, in accordance with an embodiment.
Figure 5:
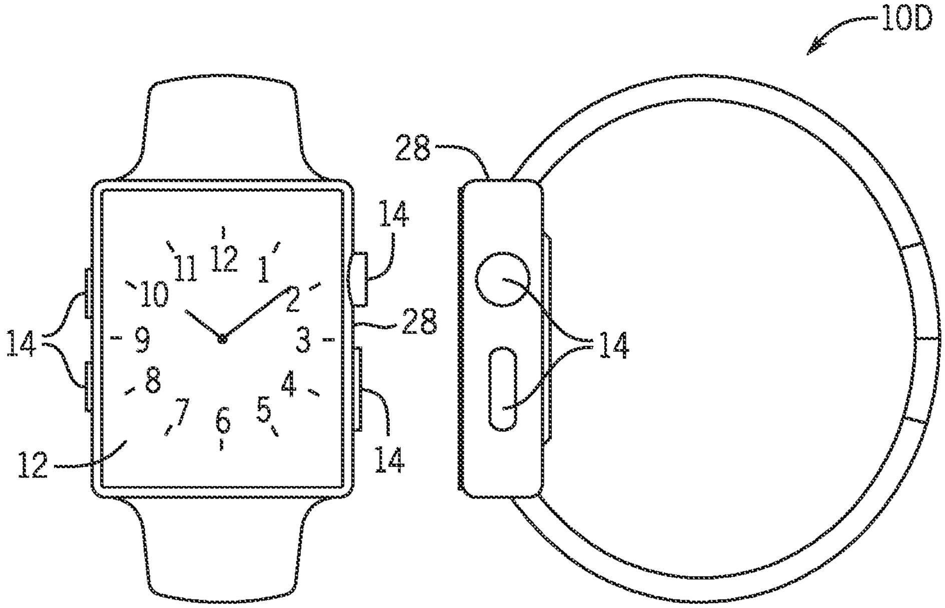
FIG. 5 are front and side views of a watch representing an example of the electronic device of FIG. 1, in accordance with an embodiment.

The electronic device 10 may take the form of a tablet device 10B, as shown in FIG. 3. By way of example, the tablet device 10B may be any iPad® model available from Apple Inc. A further example of a suitable electronic device 10, specifically a computer 10C, is shown in FIG. 4. By way of example, the computer 10C may be any MacBook® or iMac® model available from Apple Inc. Another example of a suitable electronic device 10, specifically a watch 10D, is shown in FIG. 5. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 28.

Figure 6:
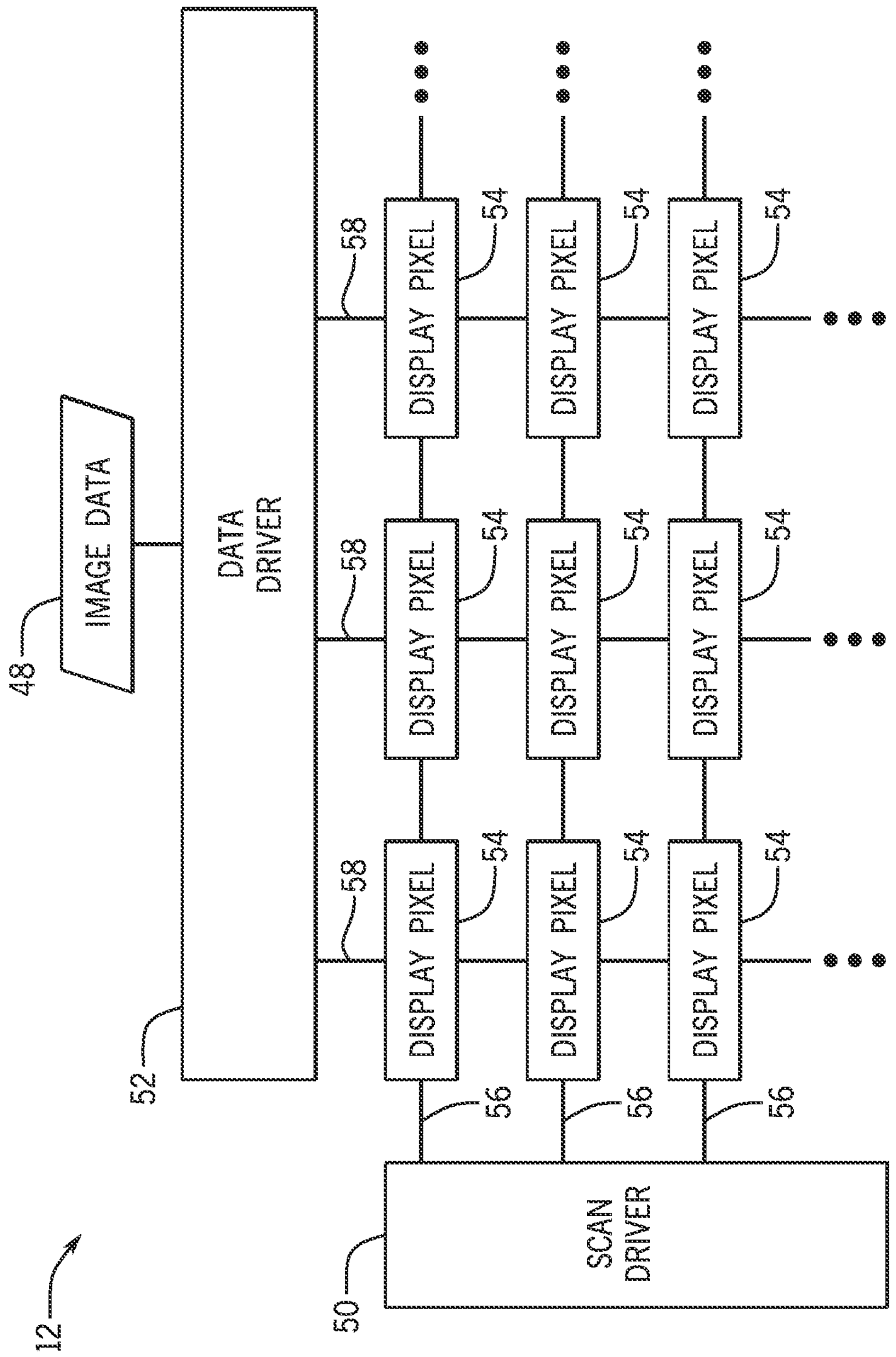
FIG. 6 is a block diagram of an electronic display of the electronic device, in accordance with an embodiment.

As shown in FIG. 6, the foldable electronic display 12 may receive image data 48 for display on the foldable electronic display 12. The foldable electronic display 12 includes display driver circuitry that includes scan driver circuitry 50 and data driver circuitry 52 that can program the image data 48 as programming signals of voltage or current into display pixels 54. The display pixels 54 may contain one or more self-emissive elements, such as light-emitting diodes (LEDs) (e.g., organic light emitting diodes (OLEDs) or micro-LEDs (μLEDs)). Different display pixels 54 may emit different colors. For example, some of the display pixels 54 may emit red light, some may emit green light, and some may emit blue light. Thus, the display pixels 54 may be driven to emit light at different brightness levels to cause a user viewing the foldable electronic display 12 to perceive an image formed from different colors of light. The display pixels 54 may also correspond to hue and/or luminance levels of a color to be emitted and/or to alternative color combinations, such as combinations that use cyan (C), magenta (M), or others. A group of display pixels 54 may form a single full-color pixel (e.g., a group of one red display pixel 54, one green display pixel 54, and one blue display pixel 54 may make up an RGB pixel).

The scan driver 50 may provide scan signals (e.g., pixel reset, data enable, on-bias stress) on scan lines 56 to control the display pixels 54 by row. For example, the scan driver 50 may cause a row of the display pixels 54 to become enabled to receive a portion of the image data 48 from data lines 58 from the data driver 52. In this way, an image frame of image data 48 may be programmed onto the display pixels 54 row by row. Other examples of the foldable electronic display 12 may program the display pixels 54 in groups other than by row.

Figure 7:
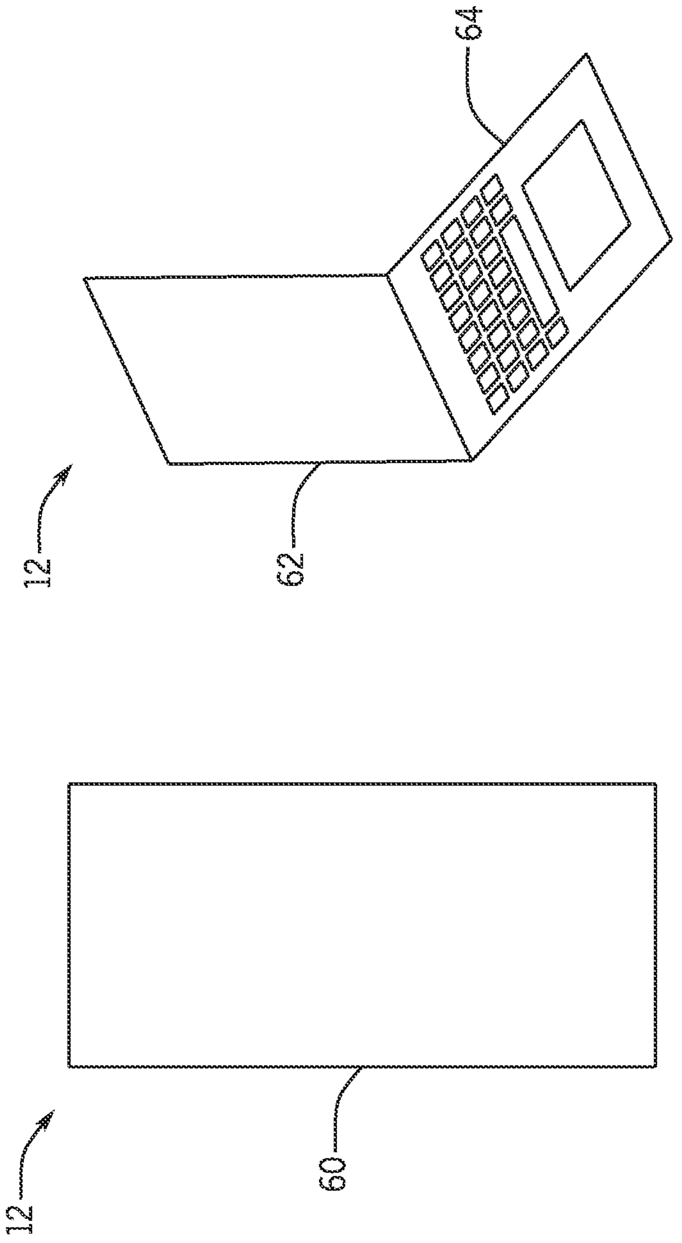
FIG. 7 is an unfolded view and folded view of an inwardly folding display, in accordance with an embodiment.

Having provided some context with regard to possible forms that the electronic device 10 may take, the present discussion will now focus on brightness compensation methods in foldable electronic displays 12 of electronic devices 10. Many foldable electronic displays 12 may have inward-folding configurations and outward-folding configurations. Keeping this in mind, FIG. 7 illustrates one embodiment of a foldable electronic display 12 that may be folded inwardly. As shown, the foldable electronic display 12 may enable adjustment of display brightness depending on the folded state of the display.

One example of the foldable electronic display 12, depicted in FIG. 7, may be able to be in an unfolded state 60 or folded inwardly into a top half 62 and a bottom half 64. When the display is folded inwardly, a top half 62 of the display may function to display media content (e.g., games, articles, videos, messages) that the user may desire to view on the electronic device 10. A bottom half 64 of the foldable electronic display 12, when folded inwardly, may function as an input medium (e.g., keyboard, keypad, dial pad) for the electronic device 10. The ability for the bottom half 64 of the display to function as an input medium enables expanded functionality of the electronic device 10. As discussed above, the foldable electronic display 12 may include one or more folds, such that the folded sections may be equal in area and/or different in area. The embodiments described below demonstrate a single fold display including the top half 62 folded section and the bottom half 64 folded section, but other embodiments may include the multiple fold display that enables folding at one or more folds and/or a flexible fold display (e.g., rollable display) that may be configured to be bent and/or rolled at one or more portions of the display.

The foldable electronic display 12 may enable separate brightness control for the top half 62 of the foldable electronic display 12 and the bottom half 64 of the foldable electronic display 12. When the display is folded inward the top half 62 of the foldable electronic display 12 may maintain a high brightness setting and the bottom half 64 of the foldable electronic display 12 may be automatically or manually adjusted to a lower brightness setting. For example, when the display is folded inward the bottom half 64 of the foldable electronic display 12 may function as an input medium such as a keyboard. In this example, the keyboard presented on the bottom half 64 of the foldable electronic display 12 does not require the same brightness setting as the top half 62 of the foldable electronic display 12 because media content is not presented on the bottom half 64 of the foldable electronic display 12. The ability to adjust the brightness of the bottom half 64 of the foldable electronic display 12 in an infolding-type case provides a cosmetic benefit to the user when viewing the content on the top half 62 of the display. In a multiple fold embodiment of the foldable electronic display 12 the brightness setting of each folded section of the display may be adjusted independently to enable independent brightness control of all the folded sections. The brightness setting of each section of the flexible display embodiment may also be adjusted independently, based on the configuration of the foldable electronic display 12 and the sections of the display that are bent and/or rolled. The ability to adjust brightness for each respective fold section of the foldable electronic display 12 further facilitates power saving benefits by reducing brightness of the display when folded and thus reducing power output.

When the foldable electronic display 12 is in the unfolded state 60, the brightness setting may be constant for the entire display. The unfolded display may use a constant brightness setting because the unfolded display is outputting the same media content on the entire display. For example, when the display is presenting a movie or video in the unfolded configuration, the video content is displayed across the entire display. The display of video content on the unfolded display thus may provide the brightness of the display to be constant to enable optimal viewing of the media content.

Figure 8:
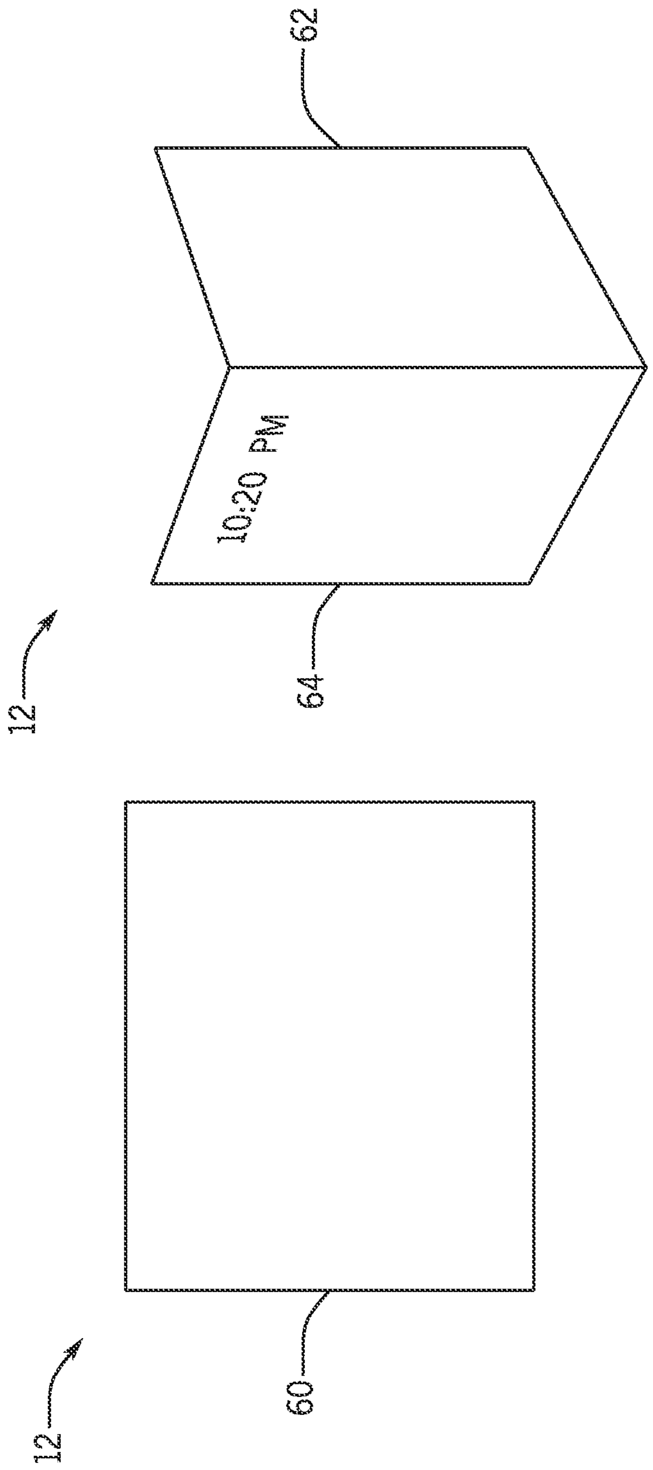
FIG. 8 is an unfolded view and folded view of an outwardly folding display, in accordance with an embodiment.

In addition to the inwardly folding embodiment of FIG. 7, the foldable electronic display 12 may also enable an outwardly folding embodiment as depicted in FIG. 8. In the case of an outwardly folding foldable electronic display 12, the top half 62 of the foldable electronic display 12 may display media content and the bottom half 64 of the foldable electronic display 12 may display a device logo or other minimal information (e.g., time, date, notifications, device wallpaper). Similar to the inwardly folding embodiment detailed above in FIG. 7, the outwardly folding embodiment, when in an unfolded state 60, may apply a constant brightness setting to the entire display. This constant brightness setting may be used in the unfolded state 60 to ensure the content appears to be uniform.

When the foldable electronic display 12 is folded outwardly, the display may set the brightness of the bottom half 64 of the foldable electronic display 12 to a lower brightness setting than that of the top half 62 of the foldable electronic display 12. The adjustment of brightness setting for the bottom half 64 of the foldable electronic display 12 occurs, for example, when the display is folded and minimal content is displayed on the bottom half 64 of the foldable electronic display 12. The ability to enable separate brightness control for each respective half of the display facilitates an improved viewing experience when the display is folded outward by emphasizing the main content being displayed on the top half 62 of the foldable electronic display 12 while saving power. This is facilitated through decreased brightness of the bottom half 64 of the foldable electronic display 12 relative to the top half 62 of the foldable electronic display 12. Similarly to the inwardly folding embodiment described above in FIG. 7, the ability to control brightness also facilitates power saving benefits.

Figure 9:
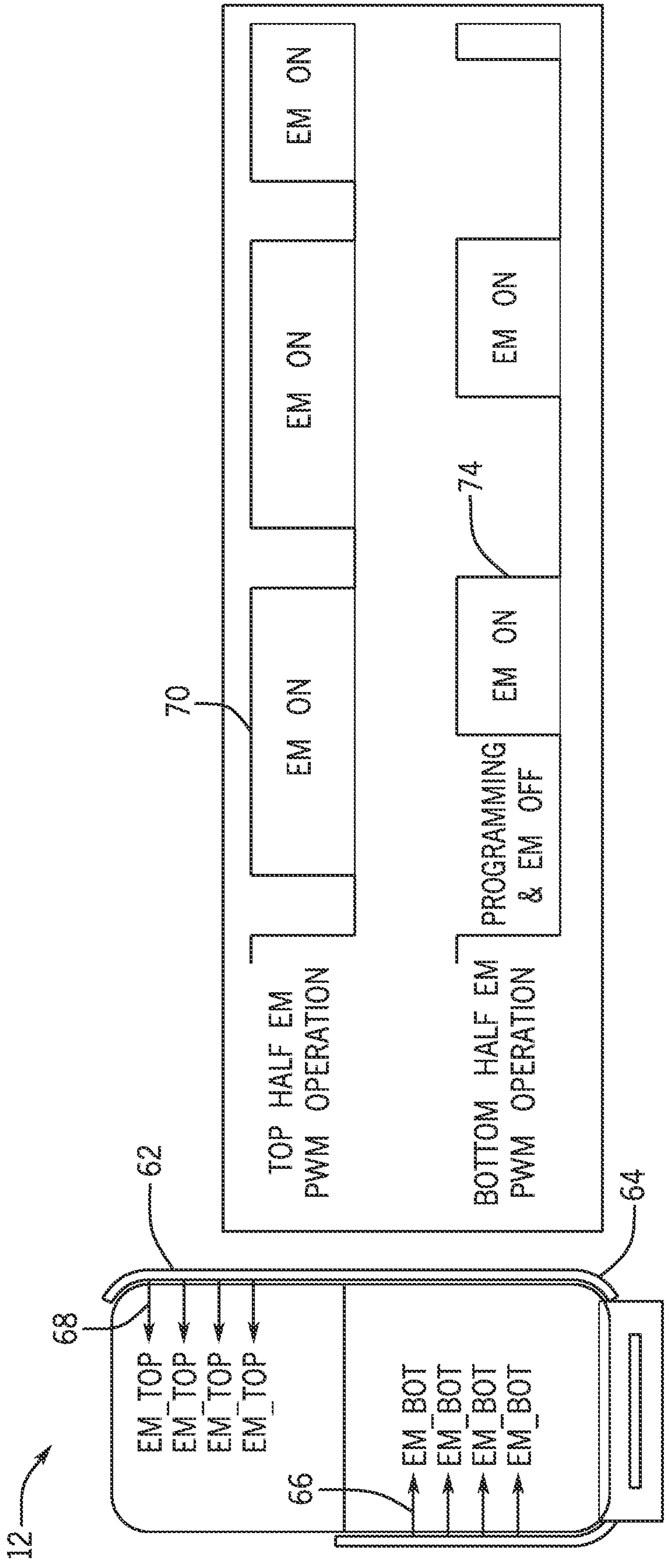
FIG. 9 is a block diagram of a Pulse Width Modulation (PWM) method of brightness control in a foldable display, in accordance with an embodiment.

The brightness setting of the foldable electronic display 12 may be controlled through the use of separate brightness control algorithms and/or driving architecture corresponding to each half of the foldable electronic display 12. FIG. 9 is a diagram illustrating a method of brightness control utilizing pulse-width modulation (PWM) to control brightness output independently in the top half 62 and the bottom half 64 of a foldable display, according to an embodiment of the present disclosure. To independently adjust brightness of the top half 62 and bottom half 64 of the foldable electronic display 12 separate PWM control for each half of the display may be implemented. The PWM method of brightness control may be applied to both inwardly folding display cases and outwardly folding display cases as described above in FIG. 7 and FIG. 8, and also may be applied to the multiple fold and flexible fold embodiments of the foldable electronic displays 12.

For example, the top half 62 of the foldable electronic display 12 and the bottom half 64 of the foldable electronic display 12 may have dual emission (EM) gate-in-panel (GIP) rails on the left side 66 and right side 68 of the display driving integrated circuitry (DIC). The EM GIP rails may control the brightness setting (e.g., a global brightness setting, display brightness value (DBV)) that indicates a global brightness value for that portion of the display panel. The DBV value may correspond to a brightness setting or parameter applied to each of the pixels of the display panel. In some cases, the DBV may cause different pixels that depict different gray level data and/or are located at different positions along the display to illuminate differently based on the DBV. For example, when the DBV is higher, the overall light output may be higher; when the DBV is lower, the overall light output may be lower. The left side 66 EM GIP rails control the DBV control input for the bottom half 64 and the right side 68 EM GIP rails control the DBV control input for the top half 62.

The ability to control DBV input for the top half 62 and bottom half 64 of the display plane enables the screen brightness to be adjusted independently for each half of the display. The brightness can then be controlled by the DIC by varying pulse length of the EM waveform signals sent to the foldable display via the DIC. The top DBV and bottom DBV control signals control the EM start pulse signal duration and enable separate control of the PWM width (e.g., length of pulse) for the top half 62 and bottom half 64 of the display plane. The longer pulse length of the EM waveform, the brighter the display will appear to the viewer. The longer pulse length enables a brighter display because the longer signal will enable the pixels in the display to turn on for a longer amount of time. For example, the top half EM PWM waveform operation 70 may send longer signal durations or lengths of EM PWM operations to the top half of the display screens DIC. To adjust and/or lower brightness of the bottom half of the display, the DBV control signals can be modified to enable a shorter pulse length. The bottom half EM PWM operation 74 may contain shorter EM signals, thus reducing brightness of the bottom half of the display when folded. This enables the bottom half 64 of the foldable electronic display 12 to reduce brightness, while still maintaining brightness of the main content displayed on the top half 62 of the foldable electronic display 12.

In a multiple fold embodiment and/or the flexible fold embodiment of the electronic foldable display 12, multiple EM GIP rails may be located at each fold section of the electronic foldable display 12. As described above, the EM GIP rails may implement similar methods of independent EM PWM waveform operations for each folded section of the electronic foldable display 12.

Figure 10:
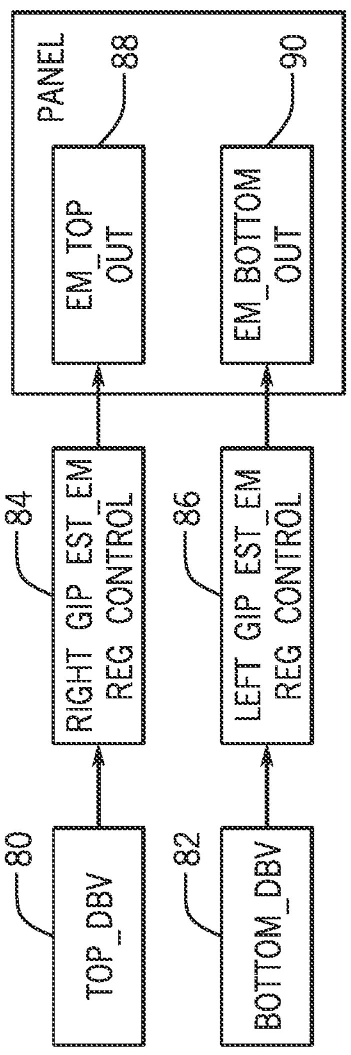
FIG. 10 is a flowchart of the PWM method of brightness control in the foldable display, in accordance with an embodiment.

FIG. 10 is a block diagram of a method of PWM control for a foldable electronic display 12. The top display brightness value (Top_DBV) 80 is adjusted based on desired brightness of the top half 62 of the foldable electronic display 12. The bottom display brightness value (Bottom_DBV) 82 can also be adjusted based on desired brightness of the bottom half 64 of the foldable electronic display 12. The Top_DBV input 80 controls the brightness output of the top half 62 of the foldable electronic display 12 and the Bottom_DBV input 82 controls the brightness for the bottom half 64 of the foldable electronic display 12. The separate inputs enable the brightness of each half of the display to be controlled independently of the other half. The Top_DBV signal 80 is then sent to the right GIP EST_EM regulation control 84 which effectively scales the brightness of the programming signals (image data) programmed into the top half 62 of the foldable electronic display 12. The regulation control adjusts the EM PWM length depending on the Top_DBV signal passed to the right GIP EST_EM regulation control 84. The left GIP EST_EM regulation control 86 receives the Bottom_DBV signal for the bottom half 64 of the foldable electronic display 12. The left GIP EST_EM regulation control 86 then converts the Bottom_DBV signal to an EM waveform signal of a specific periodic length depending on the brightness value received. The signals for both the EM waveform signals for the right GIP EST_EM regulation control 84 and the left GIP EST_EM regulation control 86 are then sent to the panel where the final output signals are specified as EM_top 88 and EM_bottom 90. The EM_top 88 and EM_bottom 90 are then sent to the pixels in the display panel, which are directed based on the signals to turn on for a determined amount of time to control brightness of the programming signals (image data) programmed into the foldable electronic display 12.

Figure 11:
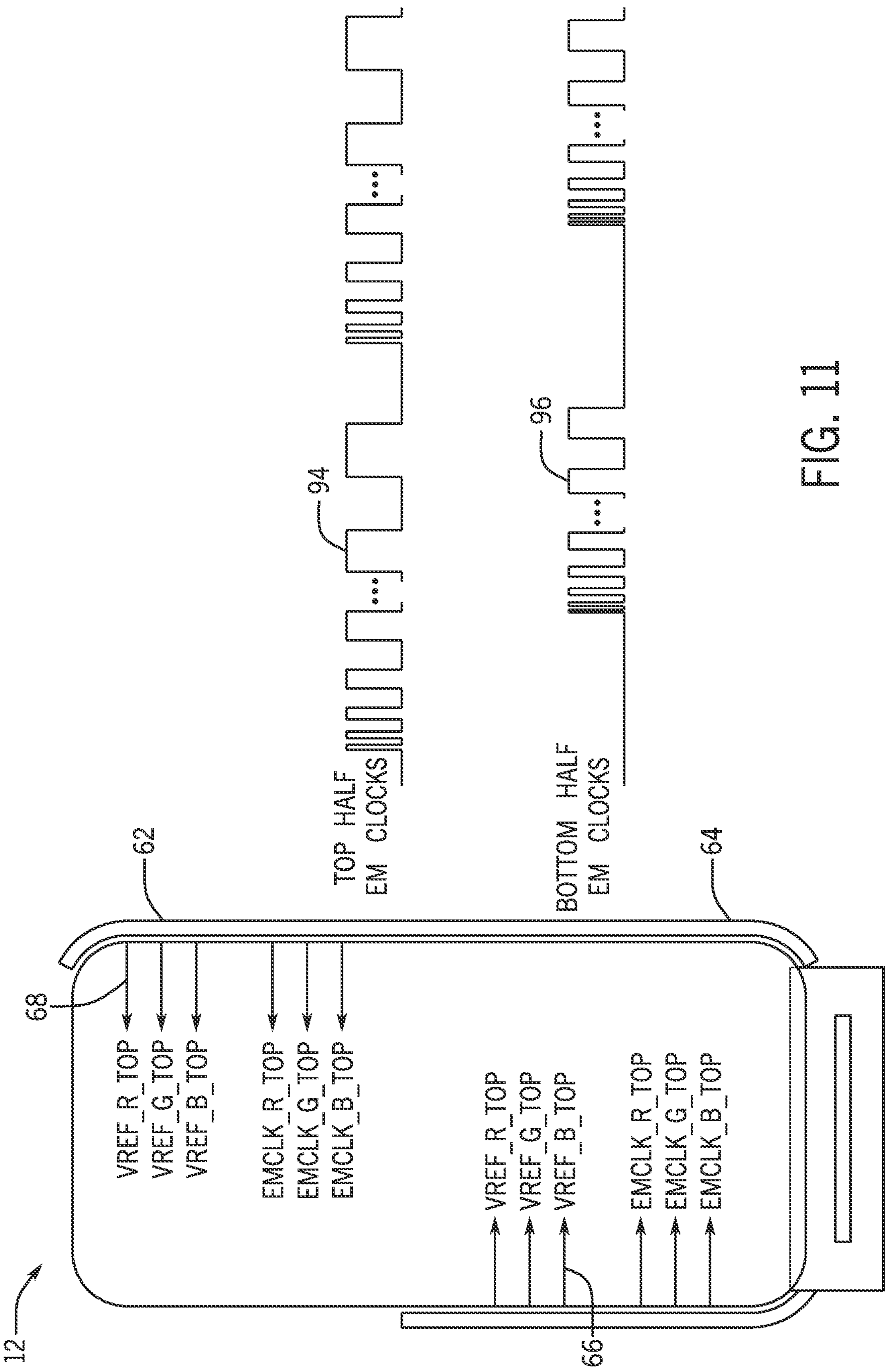
FIG. 11 is a diagram illustrating a PWM method of brightness control in a digital foldable display, in accordance with an embodiment.

FIG. 11 is method of PWM control for a digital foldable display, according to an embodiment of the present disclosure. Similar to FIG. 10 above, in this embodiment, PWM control is implemented via dual rails on the left side 66 and right side 68 of the DIC (providing reference voltages Vref and emission (EM) clocks for corresponding red (R), green (G), and blue (B) components of the top and bottom halves). In this example, the foldable electronic display 12 utilizes digital emission (EM) clock signals to control the brightness of each respective half of the foldable electronic display 12. The EM clocks have a series of pulse widths that can be added to represent different gray levels. Specifically, the display pixels may be operated to turn on or off for some specific duration according to a certain number of pulses of an EM clock per gray level. As such, scaling the pulse widths of the EM clock may cause the gray levels to be brighter or dimmer.

To control brightness, the duration of EM clock output may be modified for each half of the display. This enables the brightness of the foldable electronic display 12 to increase or decrease based on duration of EM clock output signal for each respective half of the display. For example, the display may be folded and a lower brightness for the bottom half 64 of the foldable electronic display 12 may be implemented via the DIC input control signals. For example, the duration of EM clock signal output for the bottom half EM clocks 96 could be shortened. The shortened modulation of EM clock signals sent to the panel for the bottom half 64 of the foldable electronic display 12 results in the pixels turning on for a shorter amount of time, resulting in a lower brightness output. The top half EM clock signal output could be adjusted to a longer signal so that the brightness of the top half 62 of the foldable electronic display 12 would appear brighter relative to the bottom half 64 at the same gray levels.

Figure 12:
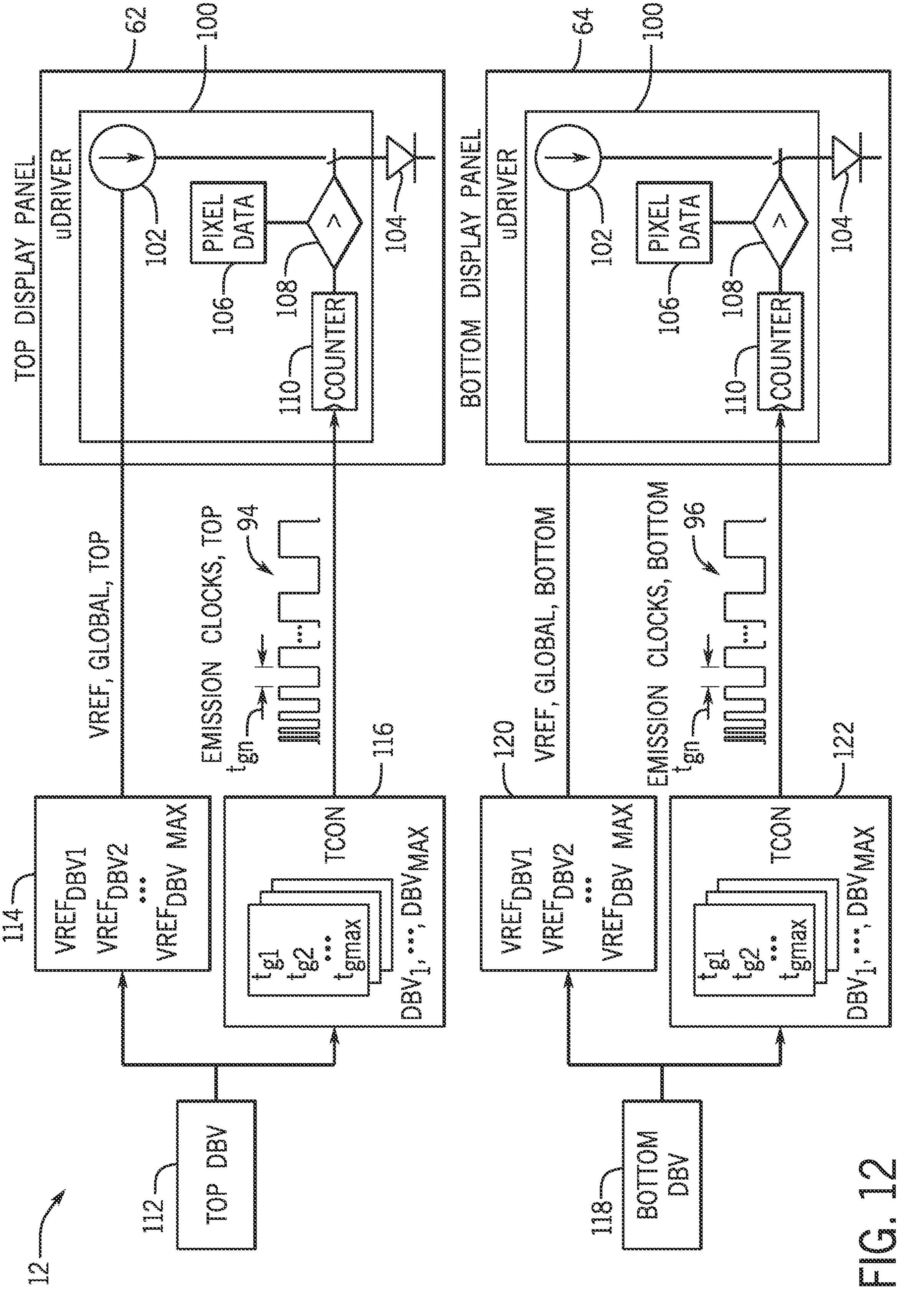
FIG. 12 is a diagram illustrating a PWM control method for digital clock controls of the digital foldable display, in accordance with an embodiment.

FIG. 12 provides an example of a digital display panel that uses microdrivers (udrivers) 100 to digitally control pixels using EM clocks scaled independently for different halves of the foldable electronic display 12. The microdrivers 100 located on both the top half 62 and the bottom half 64 may operate in a similar manner. A current source 102 may emit a current based on a reference voltage Vref. Changes in Vref cause a change in the amount of current provided by the current source 102. A light-emitting diode (e.g., LED, OLED, micro-LED) 104 may emit light in relationship to the amount of current from the current source 102. How long the light-emitting diode 104 emits light may vary depending on a current value of pixel data 106. In particular, the microdriver 100 may store the pixel data 106 in digital form in memory and compare it, in a comparator 108, with a counter 110. The counter 110 may increment based on the emission clock (EM clock) 94 or 96. Therefore, the counter 110 may increment at a rate depending on which EM clock 94 or 96 it receives.

While the pixel data 106 value remains above the value of the counter 110, the current from the current source 102 may be permitted to reach the light-emitting diode 104. Over this time, the light-emitting diode 104 may be emitting light. When the counter 110 increments to the point that the pixel data 106 value is no longer above the value of the counter 110, the current from the current source 102 may not be permitted to reach the light-emitting diode 104. At this point, the light-emitting diode 104 may stop emitting light. By controlling the amount of time that the light-emitting diode 104 is on in comparison to the time it is off, the average amount of light integrated by the human eye may be controlled.

Display brightness values (DBVs) for different halves of the display may affect the values of the reference voltage Vref and the pulse widths of the EM clocks. As mentioned above, the value of Vref affects the current emitted by the current source 102, therefore affecting the amount of light emitted by the light-emitting diode 104 while it is switched on. The pulse widths of the EM clocks affect the rate at which the counter 110 increments and therefore the length of time that the light-emitting diode 104 is in an on state. For instance, a top DBV 112 for the top half 62 of the foldable electronic display 12 may cause reference voltage selection circuitry 114 to select a value of Vref associated with the top DBV 112. The reference voltage selection circuitry 114 may include a lookup table (LUT) in memory that receives DBV as an index and determines a corresponding reference voltage "Vref, global, top" that may be generated and provided to the current drivers 102 of the top half 62 of the foldable electronic display 12. A timing controller (TCON) 116 associated with the top half 62 of the foldable electronic display 12 may use the top DBV 112 to generate the EM clock 94. For example, the TCON 116 may use a lookup table (LUT) in memory that receives the top DBV 112 as an index and determines corresponding periods between pulses (e.g., $t_{g1}$, $t_{g2}$, . . . , $t_{gn}$) of the EM clock 94 as a basis for generating the EM clock 94. Similarly, a bottom DBV 118 may be used by corresponding reference voltage selection circuitry 114 and TCON 116 for the bottom half 64 of the foldable electronic display 12 to produce a bottom reference voltage "Vref, global, bottom" and the EM clock 96. As illustrated in FIG. 11, there may be multiple Vref values and EM clocks for each half for different color components. For example, there may be a different Vref value for red light-emitting diodes 104, blue light-emitting diodes 104, and green light-emitting diodes 104. There may also be different EM clocks for red light-emitting diodes 104, blue light-emitting diodes 104, and green light-emitting diodes 104.

Figure 13:
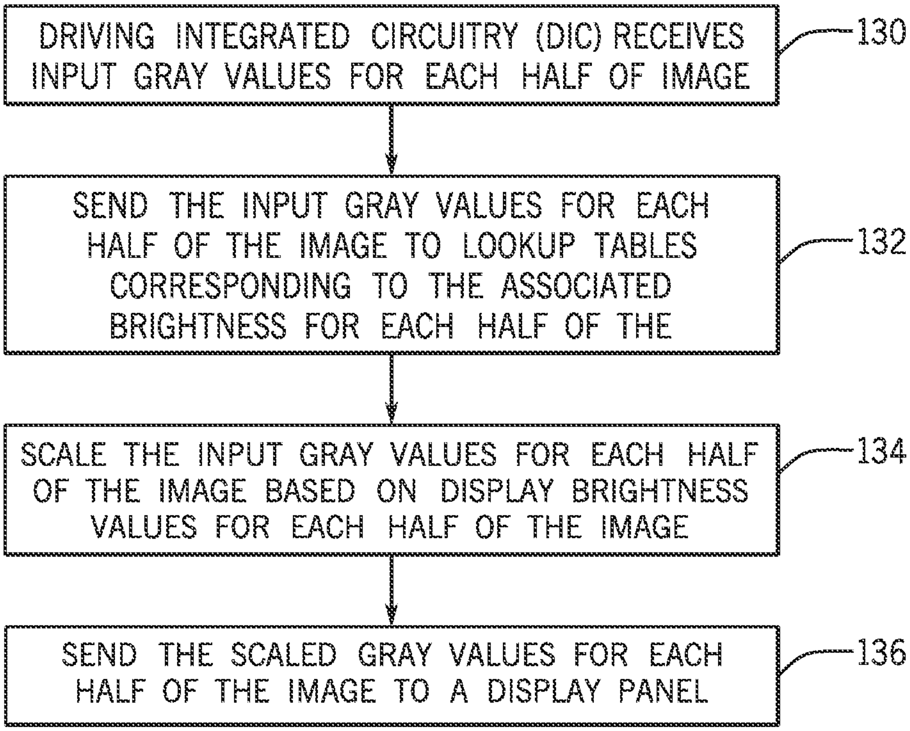
FIG. 13 is a flowchart of a method of brightness control via digital dimming in the foldable display, in accordance with an embodiment.

FIG. 13 illustrates a process flow diagram for a method of controlling foldable display brightness through digital dimming, according to an embodiment of the present disclosure. Digital dimming is implemented by adjusting and scaling gray level values for the top half 62 of the foldable electronic display 12 and the bottom half 64 of the foldable electronic display 12 separately. This method enables separate control of brightness settings for the top half 62 of the display and the bottom half 64 of the foldable electronic display 12 in both portrait driving cases and landscape driving cases of the foldable electronic display 12.

The DIC of the foldable electronic display 12 may receive input gray values for the top half and bottom half of the image (block 130). The input gray values represent the base gray levels (e.g., individual pixel brightness) for the image. The gray level data corresponds to a desired gray level for respective pixels in the foldable electronic display 12. The gray level data may include a digital pixel value (e.g., gray level) for a respective pixel of the foldable electronic display 12, as specified in image data provided to the controller or the like. In addition, the gray level data may be associated with a location of the pixel (e.g., x-coordinate, y-coordinate) with respect to the foldable electronic display 12 and a color component (e.g., red, green, blue) of a sub-pixel of the pixel. The gray values received by the DIC may be adjusted and scaled depending on the desired brightness of the image. The input gray values received by the DIC may be received at separate gray buffers. The separate gray buffers may include a top half gray buffer for input gray values corresponding to the top half of the image to be displayed and a bottom half gray buffer for gray values corresponding to the bottom half of the image to be displayed. The separate gray buffers for the top half of the image and the bottom half of the image store the input gray value data separately according to the top half and bottom half of the image. Additionally, in some configurations, the gray values may be separated based on the top half of image and bottom half of image initially when received by the DIC based on configuration of DIC in the electronic device 10 to avoid separation into separate gray buffers.

The gray values stored in the top half gray buffer and bottom half gray buffer are then scaled based on a global display brightness value (DBV) for that half. This may be performed via lookup tables (LUT) in which the gray values for each respective half of the image are scaled according to the particular display brightness value (DBV) for that half (block 132). For example, the bottom half gray values may be scaled to lower values corresponding to a lower brightness when the foldable electronic display 12 is folded and the bottom half of the image is not functioning to display main media content. The top half of the foldable electronic display image gray values may be scaled to higher values relative to the bottom half of the display so that the media content displayed on the top half is emphasized for ease of viewership (block 134). The programming signals (e.g., final output voltages) are then generated based on the scaled gray values and directed to the display panel. The scaled brightness values for the top half and the bottom half of the image are sent as programming signals (e.g., voltages) to the display panel, so that the pixels are adjusted for the corresponding brightness desired when the display is folded (block 136). This method may also be applied to the multiple fold embodiment and/or the flexible fold embodiment of the electronic foldable display 12. As described above, the gray level values may be scaled independently for each folded section of the electronic foldable display 12. The method may include multiple gray buffers for storage of gray values according to each section of the display.

Figure 14:
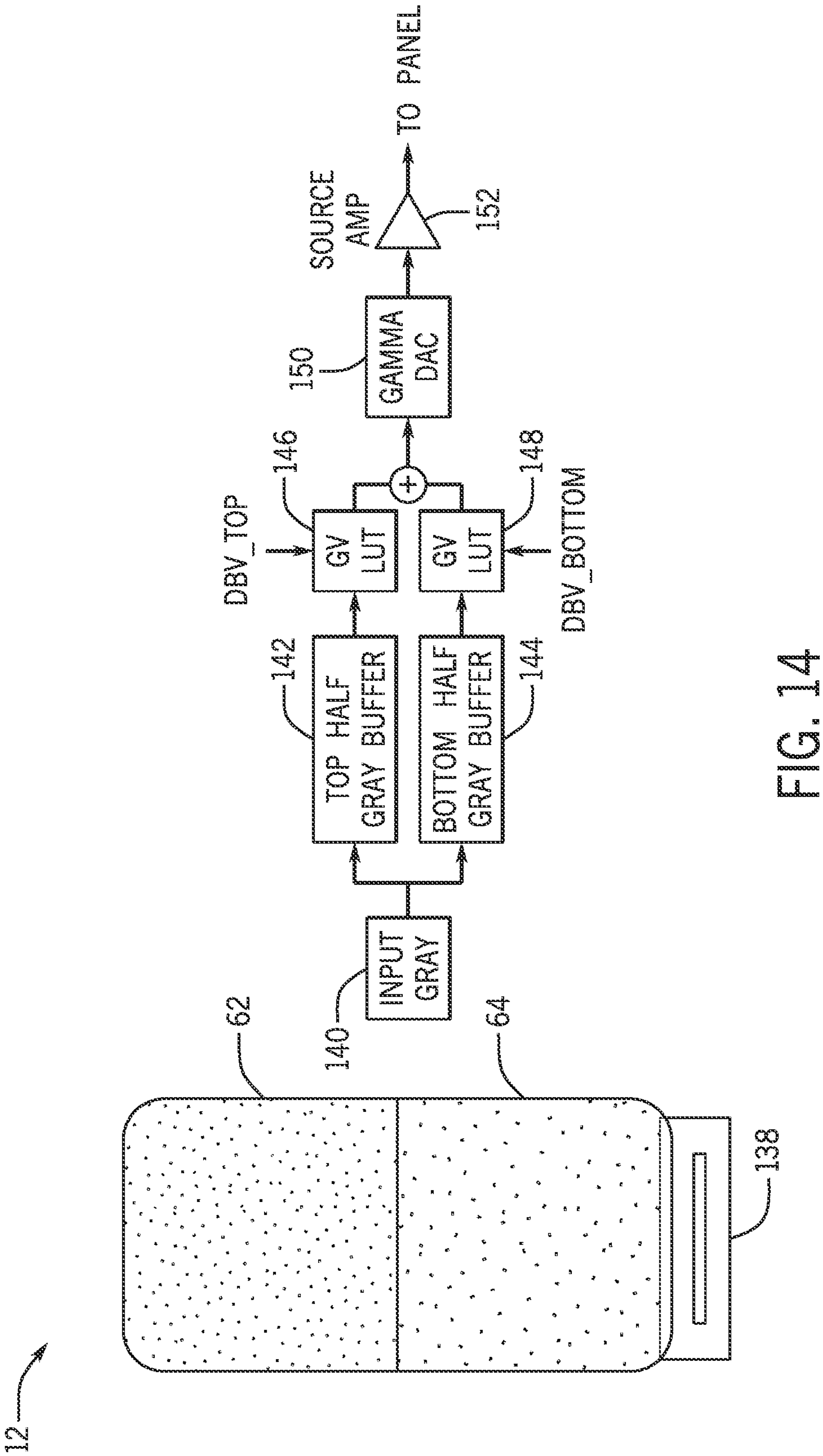
FIG. 14 is a block diagram of a digital dimming method of brightness control in the foldable display for a portrait driving case, in accordance with an embodiment.

In FIG. 14, a schematic of the digital dimming method for a portrait driving case is illustrated in which the same driver lane 138 can be utilized for EM signals sent to the top half 62 and the bottom half 64 of the display. In a portrait driving case, the input gray values for the top half of the image and the bottom half of the image are input as a single set due to the same driver lane 138 receiving the image gray value data 140. The image gray values 140 are received by the DIC. The DIC may have a separate top half gray buffer 142 and bottom half gray buffer 144. The input gray values 140 are then separated into two separate gray buffers according to each respective half of the display. The top half gray buffer 142 and the bottom half gray buffer 144 store the gray values. The gray values may be stored according to the top half image gray values and the bottom half image gray values so that brightness for each half of the display can be scaled separately. The gray values are then sent to LUTs and scaled by the LUTs corresponding to the top half gray values and the bottom half gray values. The LUTs utilized may be GV LUTs that use separate DBV flags for each respective LUT receiving the left half image gray level data and the right half image gray level data. The separate DBV flags enable scaling of the brightness values independently for each half of the image corresponding to each respective half of the display. The DBV flag for the top half of the image data (DBV_top) and the DBV flag for the bottom half of the image data (DBV_bottom) enable the image brightness to be scaled differently for the gray values corresponding to the top half of the image 146 in comparison to the bottom half of the image. For example, in the foldable electronic display 12, the bottom half 64 of the foldable electronic display 12 may function as an input medium and benefit from a lower image brightness. The DBV flag corresponding to the bottom half GV LUT 148 may be adjusted to a lower scaling value, so that the gray values for the bottom half 64, and therefore the input medium, are scaled to a lower brightness than the top half 62 of the image. The top half image gray values are scaled according to a DBV_top flag for the GV LUT for the top half image values 146, which may have a higher value corresponding to a higher brightness setting.

The separate sets of scaled gray levels corresponding to the top half and bottom half of the image are then merged together and sent through a Gamma Digital to Analog Convertor (DAC) 150. The DAC 150 converts the digital scaled gray values to analog programming signals (e.g., output voltages) that can be sent to the individual pixels of the display panel to output the corresponding brightness for each half of the image. After the final output voltages are sent to through the DAC 150, the voltages are sent through a source amplifier 152 to a display panel of the foldable electronic display 12. The display panel is then able to display the image with adjusted brightness values for each respective half of the image.

Figure 15:
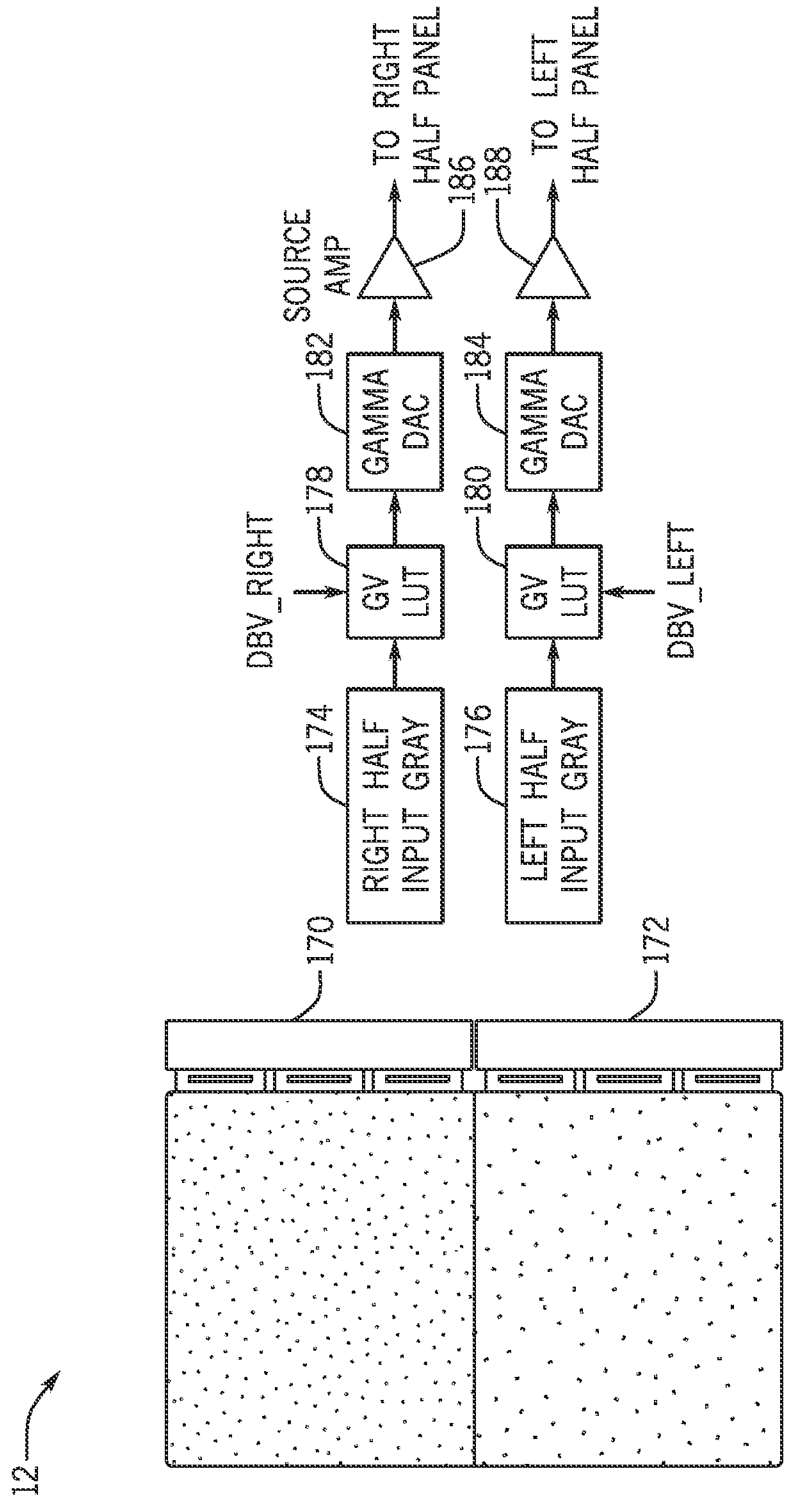
FIG. 15 is a block diagram of a digital dimming method of brightness control in the foldable display for a landscape driving case, in accordance with an embodiment.

A similar method of digital dimming is depicted in FIG. 15, which illustrates a diagram of a digital dimming method for a landscape driving case, according to an embodiment of the present disclosure. In the landscape driving case, the GIP lane is aligned along the side of the display separating the display panel into a right half of the display 170 and a left half of the display 172. In the landscape driving case, the input gray is already separated by half of display due to the GIP lane division by right half of the display 170 and left half of the display 172. Thus, in the landscape driving case, the input gray values are already separated by the DIC for the respective half of the display and can be directly input into the respective LUTs for the right half of the input gray values 174 and the left half of input gray values 176. The right half input gray values 174 are scaled by a right GV LUT 178. The LUT for the right half input gray values may vary based on a DBV flag corresponding to the desired brightness values for the right half of the display. In this way, the brightness value for the right half of the display 170 for the landscape driving case may be scaled separately from the left half of the display 172. For example, the DBV flag for the right half of the display image gray values may direct the LUT to scale brightness to a higher brightness value than the left half of the display 172. For example, when the display is folded, the right half of the display 170 may be displaying main media content. The DBV flag for the right half input gray values may be a higher value to enable the scaled gray values corresponding to the right GV LUT 178 for the right half input gray values to cause the right half of the display screen 170 to be brighter than the left half of the display 172. The left half input gray values 176 are scaled by a left GV LUT 180, in which a DBV left flag is applied to scale the gray values so that the left side image brightness may be adjusted separately from the right half image brightness.

The left half scaled gray values are then sent to a first Gamma DAC 182 to be converted to an analog programming signal (e.g., voltage signal) that can be sent to the display panel to enable the image to be displayed. The right half scaled gray values are sent to a second Gamma DAC 184 to be converted into an analog programming signal (e.g., voltage signal) that can be sent to the right half of the display 170. The right half image voltages and the left half image programming signals are directed through separate source amplifiers 186, 188 on their respective halves of the panel, so that the image data for the right half and left half of the image may be displayed. This method facilitates power saving for the electronic device 10 because lowering brightness of the display and thus power output of pixels of the display reduces the overall power consumed by the device.

Figure 16:
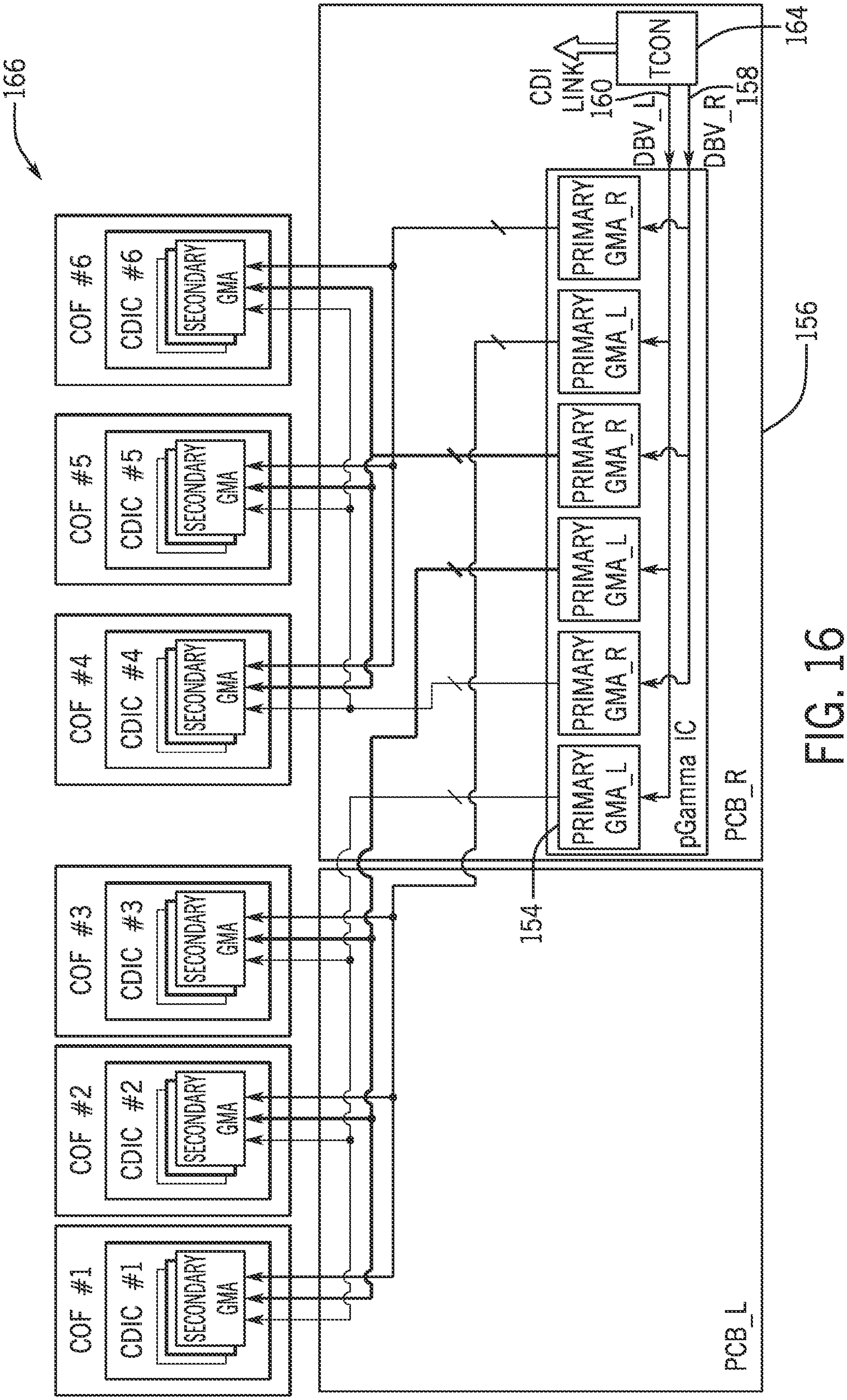
FIG. 16 is a diagram illustrating a method to control brightness in the foldable display using display driver integrated circuitry (DIC) gamma structure, in which all gamma references are housed in a single external integrated circuit (IC), in accordance with an embodiment.

FIG. 16 is a schematic of multi gamma reference generation in a single external integrated circuit (IC) for the foldable electronic display 12, according to an embodiment of the present disclosure. The multi gamma references 154 that send RGB voltage signals to the foldable electronic display 12 are housed in a single IC 156. The multi gamma references 154 for each respective half of the display screen receive DBV signals for the left half and right half of the display. The DBV_R (e.g., DBV for the right half of the display) 158 and the DBV_L (e.g., DBV for the left half of the display) 160 signals are sent from the TCON 164 to the pGamma IC 156 which houses the multi gamma references 154. The multi gamma references 154 include multiple references for RGB values for the pixels in the panel. The RBG value gamma references 154 are designated independently for each respective half of the display and each respective RGB value is adjusted based on the DBV input for each respective half of the display. The RBG gamma reference values 154 are then sent to a CDIC 166 for each respective half of the display. The single pGamma IC 156 containing the multi gamma references 154 facilitates accurate matching between left and right gamma references to avoid boundary concerns with solid gray images in unfolded display embodiments.

Figure 17:
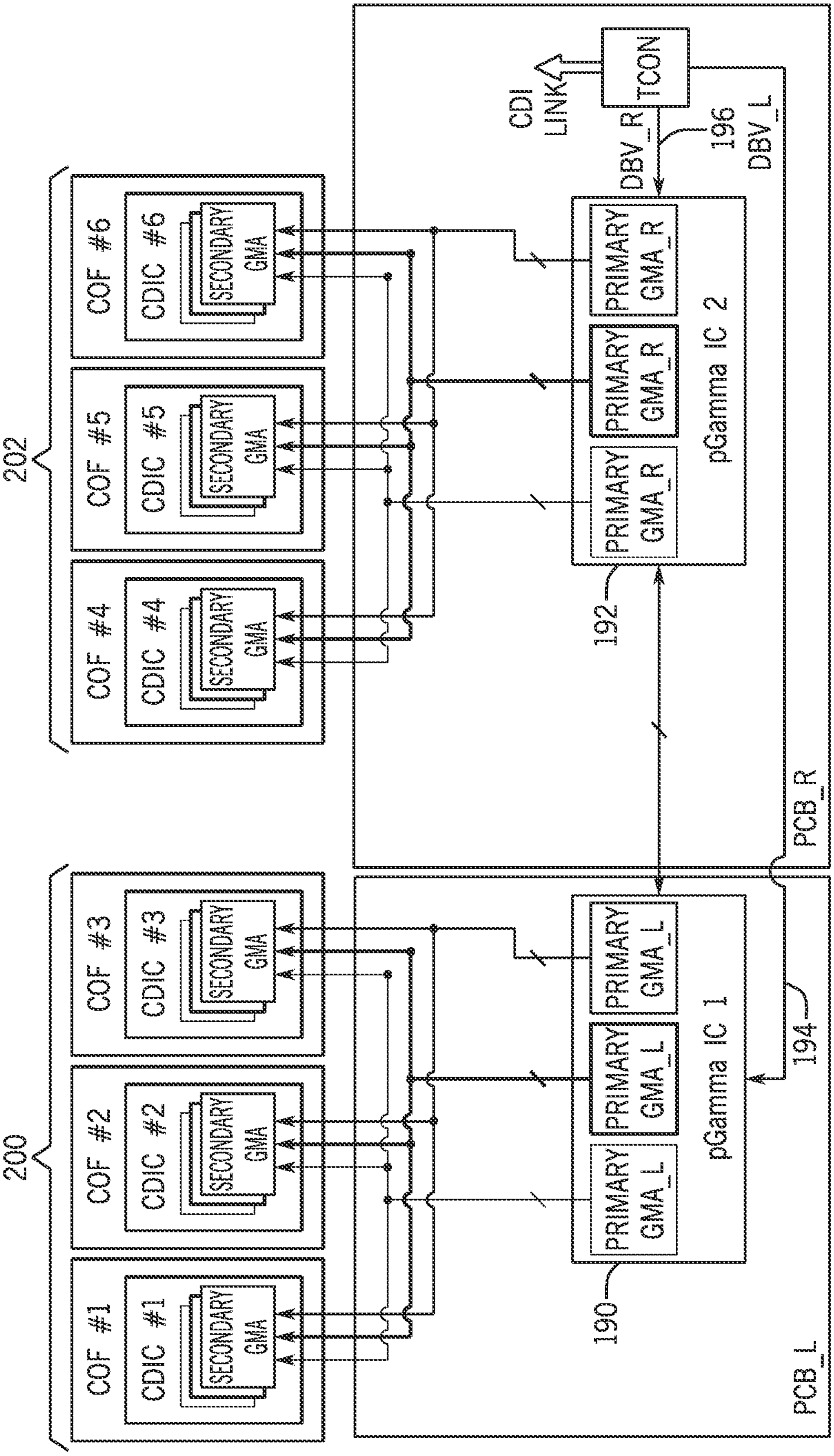
FIG. 17 is a diagram illustrating a method to control brightness in the foldable display using DIC gamma structure, in which the gamma references are housed in multiple external ICs, in accordance with an embodiment.

The gamma reference generation may also utilize multiple ICs as depicted in FIG. 17 which shows a schematic of gamma reference generation utilizing multiple ICs in a foldable display, according to an embodiment of the present disclosure. The gamma references for each half of the display may be divided into different ICs for the left half of the display and the right half of the display. For example, the RGB gamma reference values for the left half of the display may be housed in a pGamma IC on the left half of the display as left side gamma references 190. The RGB gamma reference values for the right half of the display may be housed in a pGamma IC on the right side of the display as right side gamma references 192. The DBV signals for the left side IC (DBV_L) 194 are sent from the TCON to the left half of the display 172. The DBV signals for the right side IC (DBV_R) 196 are sent from the TCON to the right half of the display 170. The configuration of multiple ICs enables separation of left side gamma references 190 and right side gamma references 192. This configuration facilitates optimization of gamma routing to the CDIC for the left side of the display 200 and the right side of the display 202.

Figure 18:
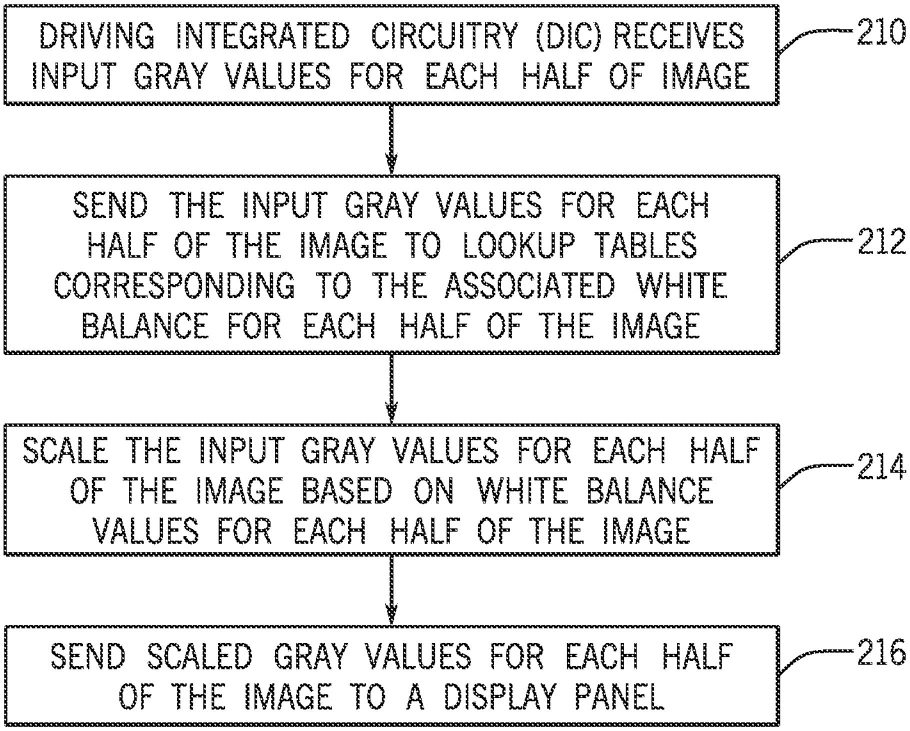
FIG. 18 is a flow chart of a method of color control for the foldable display, in accordance with an embodiment.

The digital dimming method can also be implemented for color control in low light environments or other environmental conditions, as depicted in the flow diagram in FIG. 18, according to an embodiment of the present disclosure. In this method color control is implemented according to special modes (e.g., Night Shift®, True Tone® by Apple Inc.) of the display that are set based on environmental conditions. The foldable electronic display 12 may adjust color output of the top half 62 and the bottom half 64 of the display according to the special mode settings. The adjustment of color output based on special mode settings may be facilitated through the use of LUTs to adjust white balance programming signals (e.g., output voltages) for each respective half of the foldable electronic display 12. These techniques may be implemented using any suitable circuitry that may adjusts gray values to account for changes in color modes (e.g., in addition to, or instead of, a brightness setting such as DBV). For example, the circuits described with respect to FIGS. 14, 15, 16, and 17 may, additionally or alternatively, adjust gray values for different color modes for different parts of the foldable electronic display 12.

The DIC of the foldable electronic display 12 may receive input gray values for the bottom half of the image and the top half of the image. The input gray values may be received as a single set, and sorted through the use of a top gray buffer and a bottom gray buffer. The input gray values may send the top image gray values into the top gray buffer via the DIC and send the bottom half image gray values into the bottom half gray buffer via the DIC (block 210). The image gray values for the top half and bottom half of the image stored in the respective top half gray buffer and bottom half gray buffer may then be sent to the LUTs (block 212). The top half image gray values stored in the top half gray buffer may be sent to a LUT with a special mode flag to scale the gray values to correspond to the desired white balance associated with the settings of the special mode. The bottom half image gray values may also be sent to a LUT with a special mode flag to scale the gray values to correspond to the desired white balance associated with the special mode designated for the bottom half of the image (block 214). The scaled gray values corresponding to desired white balance for the image may then be sent to the display panel, so that the pixels may output the color corrected image according to the special modes set for the top half 62 and the bottom half 64 of the display (block 216).

Figure 19:
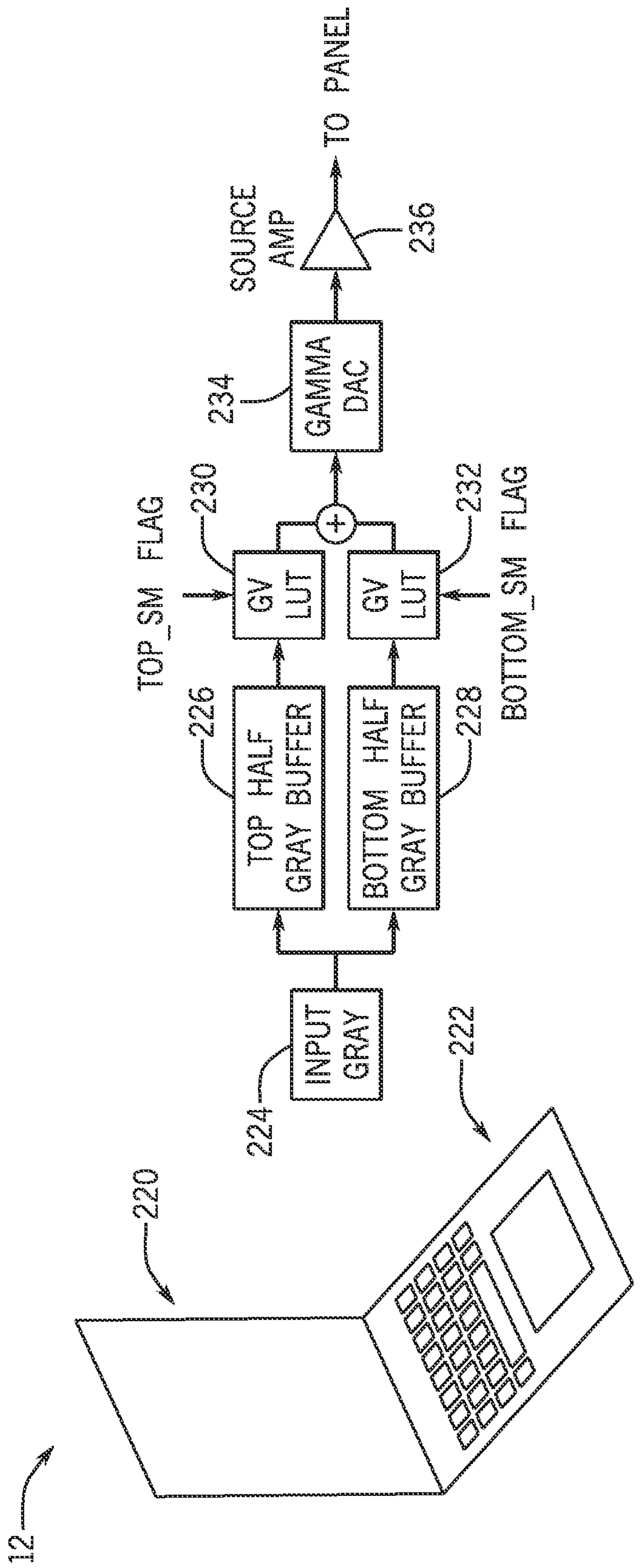
FIG. 19 is a block diagram of a method of color control for the foldable display, in accordance with an embodiment.

The method of color map control for the top half 62 and bottom half 64 of foldable displays, is further depicted in the flow chart in FIG. 19, according to an embodiment of the present disclosure. In FIG. 19, a diagram of a foldable electronic display 12 that is folded inward is depicted. The top half 62 is depicted as applying a blue-light-reducing color shift mode such as Night Shift® by Apple Inc. to the top half of the display 220. This mode may be implemented in low light environments and enables the foldable electronic display 12 to dim down blue light for improved eye comfort of user. The bottom half 64 of the foldable electronic display 12 may maintain a Normal Mode 222 for the input medium displayed to keep the user interface of the input medium visually appealing. To implement the different modes for each half of the foldable electronic display 12 dependent on environmental conditions a method of digital dimming as described above in FIG. 18 is applied.

The DIC of the foldable electronic display 12 receives image gray values for the image. The input image gray values 224 received by the DIC may then be separated into a top half gray buffer 226 of the DIC and a bottom half gray buffer 228 of the DIC. The separate gray buffers facilitate separation of image data for each half of the foldable electronic display 12, so that image data can be scaled independently to adjust for the special mode settings. The top half gray buffer 226 receives the image gray values for the top half of the display. The image gray values for the top half of the display that are stored in the top half gray buffer 226 are then directed to a GV gamma LUT 230 to be scaled to the desired special mode set for the top half 62 of the foldable electronic display 12. For example, a blue-light-reducing mode such as Night Shift® by Apple Inc. may be desired to be applied to the top half 62 of the foldable electronic display 12 in a low light environment. The GV gamma LUT 230 corresponding to the top half of the display may apply a special mode flag to the LUT corresponding to that color shift mode. This flag may enable the LUT to scale the gray value to a value associated with the desired white balance so that blue light of the image is dimmed down. The bottom half gray values stored in the bottom half gray buffer 228 may implement a similar process to apply a Normal mode to the bottom half 64 of the foldable electronic display 12 in terms of color control. The bottom half gray values stored in the bottom half gray buffer 228 are transferred to a GV gamma LUT 232 corresponding to a bottom special mode flag that indicates a normal mode be applied to the values.

The bottom half gray values are then scaled corresponding to the desired white balance for the normal display of the image. The two sets of scaled gray values corresponding to the desired white balance for the top half and bottom half of the image are merged together and sent through a Gamma DAC 234 so that the programming signals (e.g., voltages) can be sent to and received by the individual pixels of the display panel. The final analog programming signals (e.g., output voltages) are then directed through a source amplifier 236 to the pixels of the panel. This method may also be applied to the multiple fold embodiment and/or the flexible fold embodiment of the electronic foldable display 12, gray level values for each folded section of the display may be adjusted and scaled independently to control the white balance for each section of the display.

Figure 20:
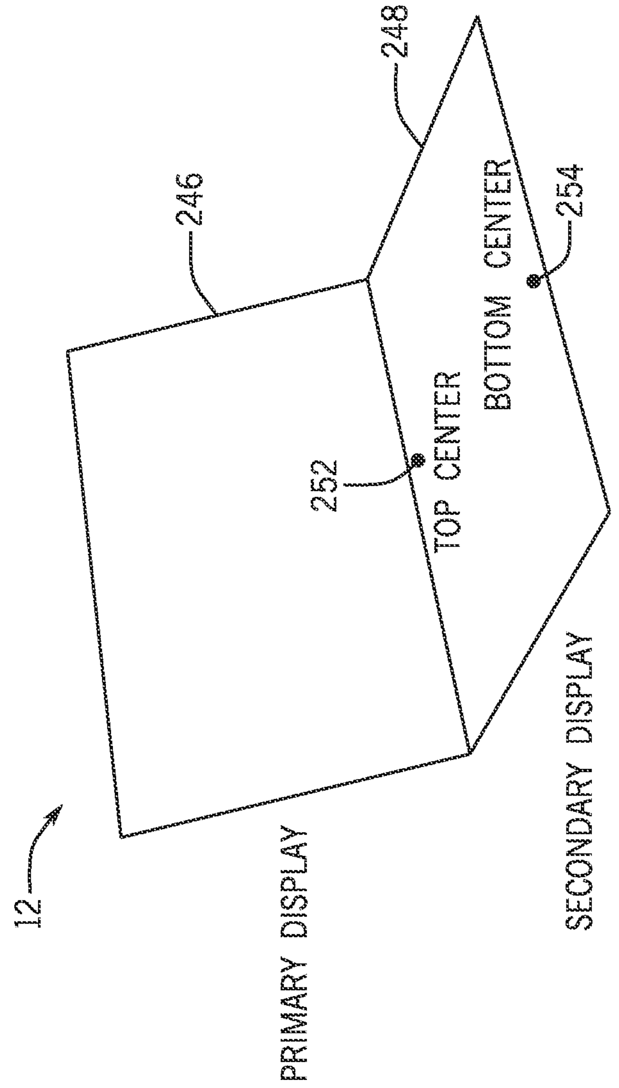
FIG. 20 is a diagram illustrating a method of manual color and luminance compensation for the foldable display, in accordance with an embodiment.

FIG. 20 is a diagram of the foldable electronic display 12 that uses a manual compensation method of luminance and brightness control. In the example of FIG. 20, the foldable electronic display 12 is folded inward. Thus, the top half of the display is represented as a primary display 246 and the bottom half of the display is represented as a secondary display 248. The user may manually calibrate the color and/or luminance on the secondary display 248 based on user preferences. An example calibration procedure is described as follows.

The user may first calibrate the color and/or luminance of the top center 252 of the secondary display 248 using a user control (e.g., touch screen component, track pad, keyboard) of the display. The user may then calibrate the color and/or luminance of the bottom center 254 of the display using a user control of the display. The current fold angle of the display is also determined and stored by the system in a memory component of the system. The system of the foldable display may then take into account the luminance and/or color levels set for the top center 252 and bottom center 254 of the display and the current fold angle of the display. The system then automatically interpolates between the two calibration points based on pre-measured display luminance and color data stored in the memory and the angle of the foldable display. This interpolation is used to adjust luminance and/or color of the secondary display, according to user preferences and settings. The user may repeat this process in a multiple fold and flexible fold embodiment of the foldable electronic display 12 for multiple sections of the display (e.g., secondary display sections).

Figure 21:
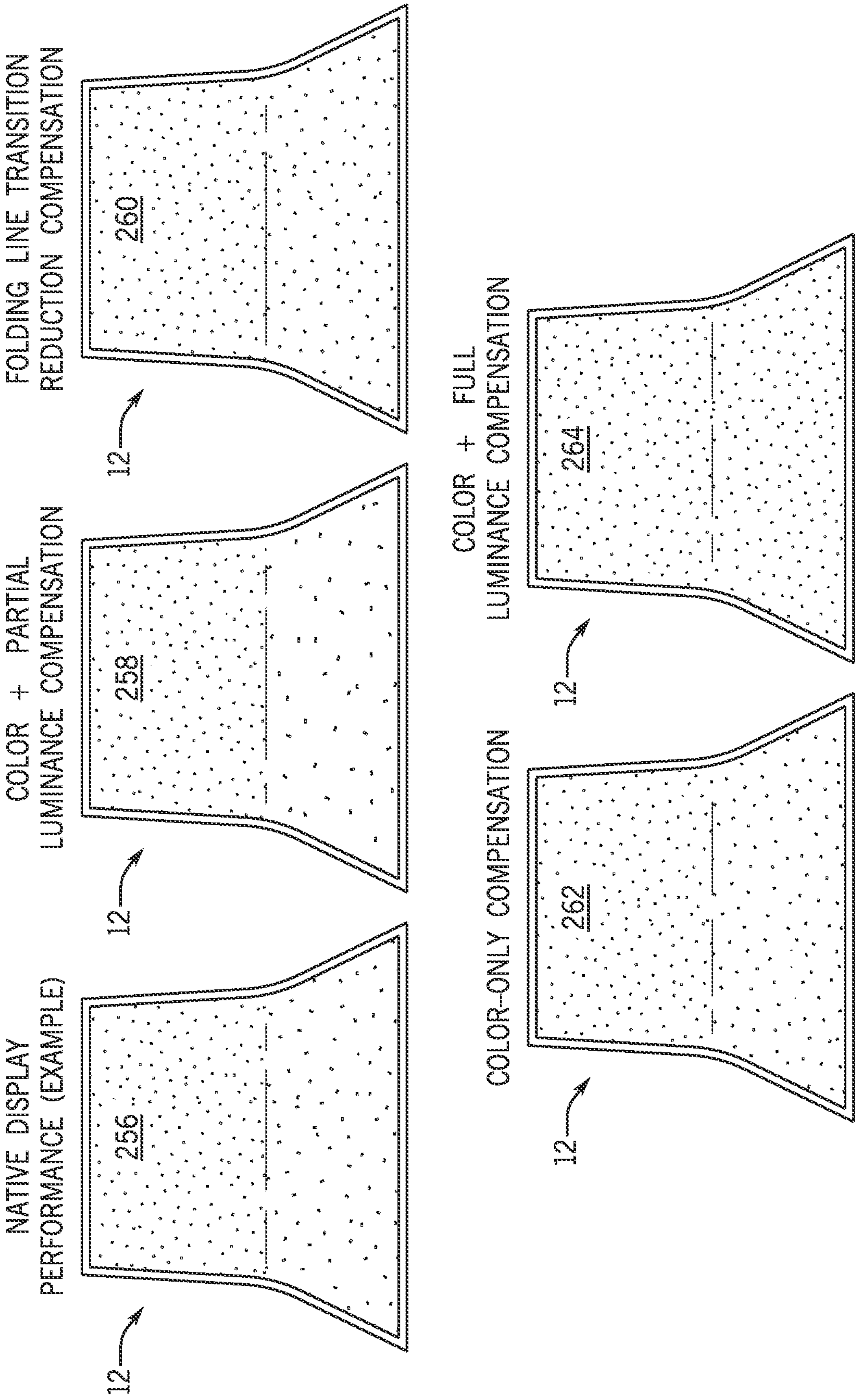
FIG. 21 is a diagram illustrating multiple modes of color and luminance control for the foldable display, in accordance with an embodiment.

FIG. 21 is an illustration of multiple methods of color and luminance compensation that can be applied to foldable electronic displays 12, according to an embodiment of the present disclosure. Without compensation, a foldable electronic display 12 labeled 256 may be folded inward and may display content on the bottom half and top half of the display that appears distorted on the bottom half. The foldable electronic display 12 may also enable folding at multiple sections of the display and the content on multiple folded sections of the display may appear distorted depending on the fold angle of the multiple folded sections. For example, in the single fold embodiment the bottom half of the display image content may appear to the user to have a lower luminance and distorted color output compared to the top half 62 of the foldable electronic display 12. The lower luminance and distorted color appearance of the bottom half of the display may cause the user to have a diminished viewing experience due to decreased luminance and color distortion of the image on the bottom half of the display. The user may desire to adjust color and luminance settings to improve viewing experience. By way of example, the image data may be adjusted so that an image displayed on both halves of the foldable electronic display 12 appears to have a uniform white point or a uniform global brightness value despite variations in folding angle or viewer eye position.

The next few examples illustrate the types of compensation that can be performed and the effect they have on display color and luminance relative to the user's viewpoint. For a color-only compensation method applied to the foldable electronic display 12 labeled 258, the color for the bottom half of the foldable electronic display 12 may be adjusted so that the color output of the bottom half of the foldable electronic display 12 appears to the viewer to be consistent with the color output of the top half of the foldable electronic display 12. In the color-only compensation foldable display example labeled 258, the luminance is not compensated for the bottom half of the display; therefore, the bottom half appears to the user to have a lower luminance output compared to the top half of the foldable electronic display 12, but the color does not appear to be distorted. This color-only compensation may be performed when the bottom half of the display is not displaying main content, but the user may still desire consistent color output for aesthetic purposes.

The foldable electronic display 12 labeled 258 illustrates applying color compensation with partial luminance compensation. This may avoid color distortion and make brightness distortion less apparent while still saving power. The actual brightness of the bottom half of the foldable electronic display 12 may be greater than that of the top half. This is because the on-axis light emission of the top half may be directed to the viewer's eyes, while the on-axis light emission of the bottom half may be directed away from the viewer's eyes. As such, the light from the bottom half that reaches the viewer's eyes thus approaches from an off-axis angle. Increasing the brightness of the bottom half of the foldable electronic display 12 to appear slightly brighter than it would be without compensation may improve the viewing experience without consuming excessive power.

The foldable electronic display 12 labeled 262 illustrates applying a folding line transition. Here, brightness levels on the bottom half of the foldable electronic display 12 may be increased the most nearest to the folding line between the top half and the bottom half of the foldable electronic display 12 and progressively reduced until reaching the bottom of the bottom half. This may effectively conceal the folding line, creating a smooth transition from the top half to the bottom half. The folding line transition may be applied at any fold line of the foldable electronic display 12 in the multiple fold embodiment and the flexible fold embodiment.

The foldable electronic display 12 labeled 264 illustrates applying color compensation and full luminance compensation. In effect, the color and brightness of the bottom half may be adjusted so that, at the viewing angle of a person's eyes, the brightness and color of the top half and bottom half are the same. This may consume more power, but may allow media content that spans both the top half and bottom half to have the same appearance.

Figure 22:
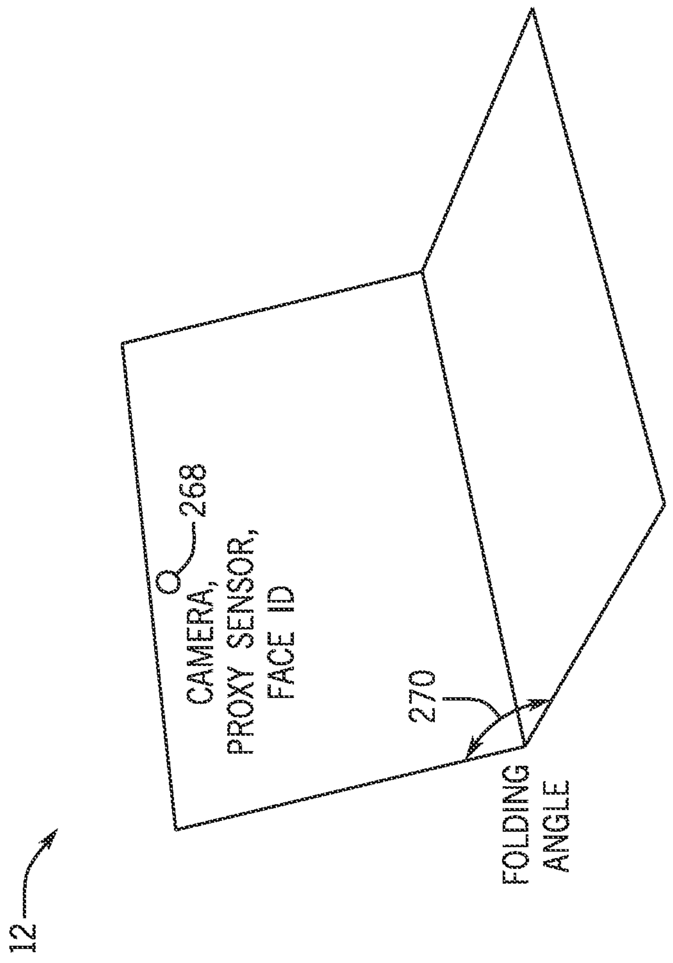
FIG. 22 is a diagram illustrating a foldable display that may perform semi-automatic and automatic color and luminance compensation, in accordance with an embodiment.

FIG. 22 represents a schematic of a foldable electronic display 12 that uses an eye tracker component to perform color and/or luminance compensation. The foldable electronic display 12 of FIG. 22 may perform compensation based on eye position relative to the foldable electronic display 12. The foldable electronic display 12 may determine eye position of the viewer relative to the display using an eye tracking system 268 enabled by a camera, proxy sensor, face recognition (e.g., Face ID® by Apple Inc.), or any other component of the foldable electronic display 12 that can provide eye tracking. As used herein, the eye tracking system 268 may include an eye tracker, which may encompass any suitable component for measuring and/or monitoring positions and/or movement of one or both eyes of a person viewing the foldable electronic display 12, such as a video camera, a light detection and ranging (LIDAR) sensor, a depth sensor, electrical potential sensors, and/or software recognition techniques. For instance, an eye tracker may be a camera that records the movement of a viewer's eye(s) as the viewer looks at the foldable electronic display 12. However, many different practices, techniques, and/or components may be employed to track a viewer's eye movements. For example, different types of infrared/near infrared eye tracking techniques such as bright-pupil tracking and dark-pupil tracking may be used. In these types of eye tracking, infrared or near infrared light is reflected off of one or both of the eyes of the viewer to create corneal reflections. A vector between the center of the pupil of the eye and the corneal reflections may be used to determine a point on the foldable electronic display 12 at which the viewer is looking.

A folding angle 270 of the foldable electronic display 12 may also be utilized to estimate eye position with or without the eye tracking system 268 to also enable luminance and color compensation based on estimated eye position. In the case of a multiple fold and/or flexible fold embodiment the fold angle of each fold section may be determined. In the examples shown here, the folding angle 270 is some value less than 180°, but in other examples the folding angle 270 may be greater than 180°. The folding angle 270 may be detected using any suitable sensors. For example, the folding angle 270 may be detected using a sensor in a hinge at a folding line, using an accelerometer disposed in the device (e.g., in a portion of the electronic device 10 that corresponds to the top half of the foldable electronic display 12), or using an estimate of relative position between the two halves using a camera, to name a few examples.

In some embodiments, semi-automatic luminance and/or color compensation can be enabled by the foldable electronic display 12. For example, the foldable electronic display 12 may provide the user a series of images (e.g., such as circles) on the display at various positions (e.g., such as on the top and bottom of the display). The luminance and color of the images may be varied throughout the foldable electronic display 12. The user may be prompted to select a pair of images that is a best match (e.g., most visually pleasing for the user) in terms of color and luminance. The foldable electronic display 12 is then able to utilize the user selected images along with the color and luminance data of the selected images, to automatically calibrate the display for luminance and color based on the user selections. Additionally, voice commands may be implemented to aid in calibration of color and luminance of the foldable electronic display 12. For example, upon an audio command from the user transmitted to the electronic device or a touch command from the user, the electronic device may display a screen that enables the user to scroll through a variety of calibration options. The user may scroll through the variety of calibration options shown on the foldable electronic display 12 and then may indicate by a voice command or touch command a calibration option that is satisfactory to the user.

In another embodiment, the foldable electronic display 12 may utilize a method of eye tracking in combination with a determined current folding angle 270 of the foldable electronic display 12 to determine change in the user eye position and the position of the folded display in terms of user eye position. The display is then able to utilize the current one or more fold angles 270 of the display, in combination with the current user eye position, to adjust the calibration of the display color and luminance in real time based on the current eye position of the user and the one or more fold angles 270 of the display.

Figure 23:
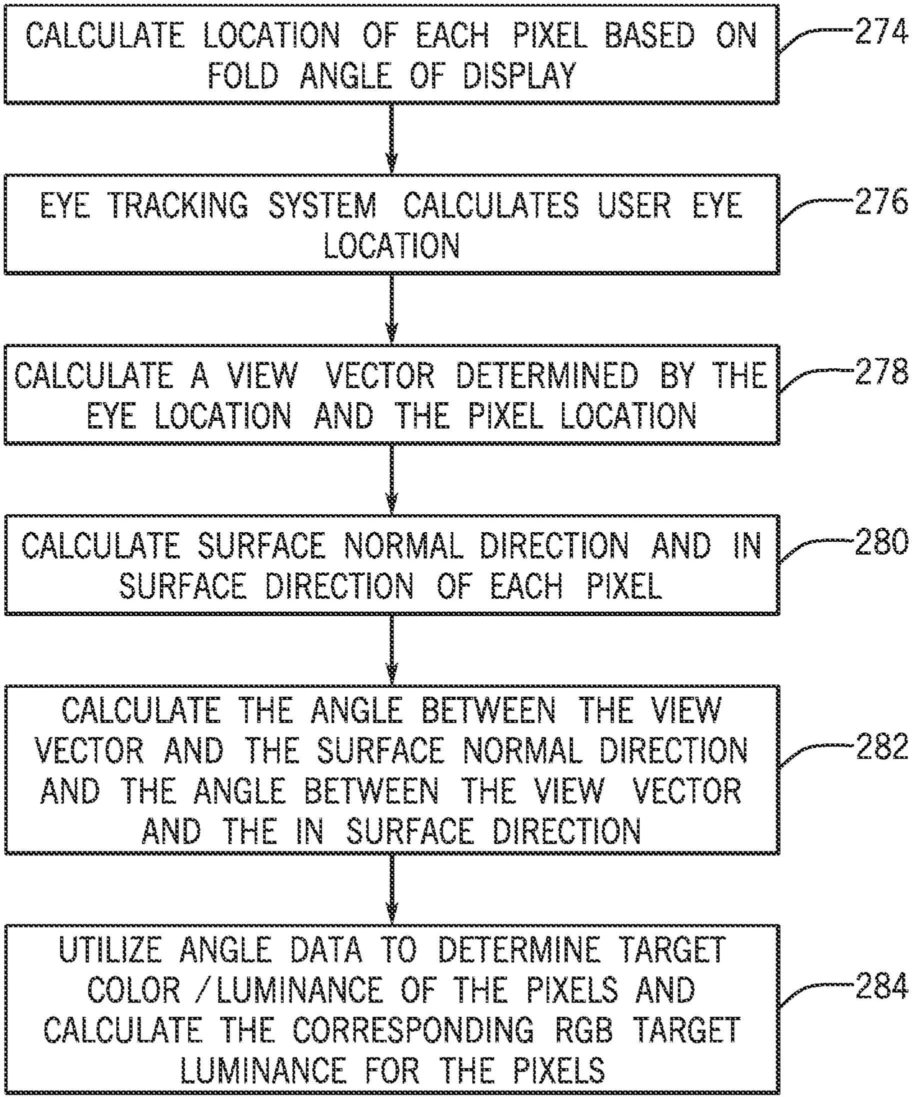
FIG. 23 is a flowchart for a method of automatic luminance and color compensation in the foldable display based on eye tracking, in accordance with an embodiment.

FIG. 23 is a process flow diagram of a method for luminance and/or color compensation in foldable displays based on eye position tracking. The eye position of the user can be identified through utilizing the eye tracking system 268, which may include a camera, proxy sensor, face recognition (e.g., Face ID® by Apple Inc.), or any other component of the foldable electronic display 12 that can enable eye tracking. The system first calculates the location of each pixel on the foldable electronic display 12 based on the fold angle of the display (block 274). The pixel location data based on fold angle is stored in memory. The system may enable pixel coordinates on the display to be mapped with regard to the fold angle of the display, because the location of the pixel relative to the top half 62 and the bottom half 64 of the foldable electronic display 12 and the corresponding coordinate directions are dependent upon the fold angle. The fold angle and pixel location on the display relative to fold angle may be dynamically updated by the system as fold angle of the display is adjusted by the user. The eye position of the user is then calculated by utilizing the eye tracker component of the electronic device. The eye position is collected and dynamically updated throughout the user's viewing experience with the foldable electronic display 12 (block 276).

The system of the foldable electronic device 10 utilizes the eye location and the location of the pixels on the foldable electronic display 12 relative to fold angle to calculate the view vector between the eye position and each pixel of the display (block 278). The view vector may be calculated for each pixel on the foldable electronic display 12 relative to the user eye position. The view vectors corresponding to each pixel are then stored in memory for later calculations corresponding to each pixel. The normal direction of each pixel relative to fold angle may also be determined. The normal direction of each pixel is determined according to both the top half of the screen and the bottom half of the screen, along with the in surface direction of each pixel relative to each respective half the display screen (block 280).

All the collected angle data for each respective pixel of the foldable electronic display 12 screen is then utilized by the system to determine the angle between the view vector for each respective pixel and the surface normal direction for each respective pixel for each half of the foldable electronic display 12. The angle between each pixels view vector and the in surface direction is also calculated for each respective pixel for each half of the foldable electronic display 12. The respective angles between the view vector and the normal surface and in surface direction for each pixel of the foldable electronic display 12 are utilized by the system of develop a 2D map with respect to all the pixels and the respective angles for the foldable electronic display 12 (block 282).

The angle data contained in the 2D map for the foldable electronic display 12 is then utilized to determine the target luminance and color of the pixels and calculate the corresponding RGB pixel target luminance for all pixels of the foldable electronic display 12. The target data for color and luminance for each half of the foldable electronic display 12 is implemented in combination with the pixel angle data corresponding to each pixel based on viewer eye position along with each panel's performance data. This data in combination is implemented by the system along with algorithms utilized to determine the target RGB luminance for all pixels of the foldable electronic display 12 that corresponds to the target color and luminance setting for the panel (block 284). This method may be repeated for each fold angle in a multiple fold and/or flexible fold embodiment of the electronic foldable display 12.

Figure 24:
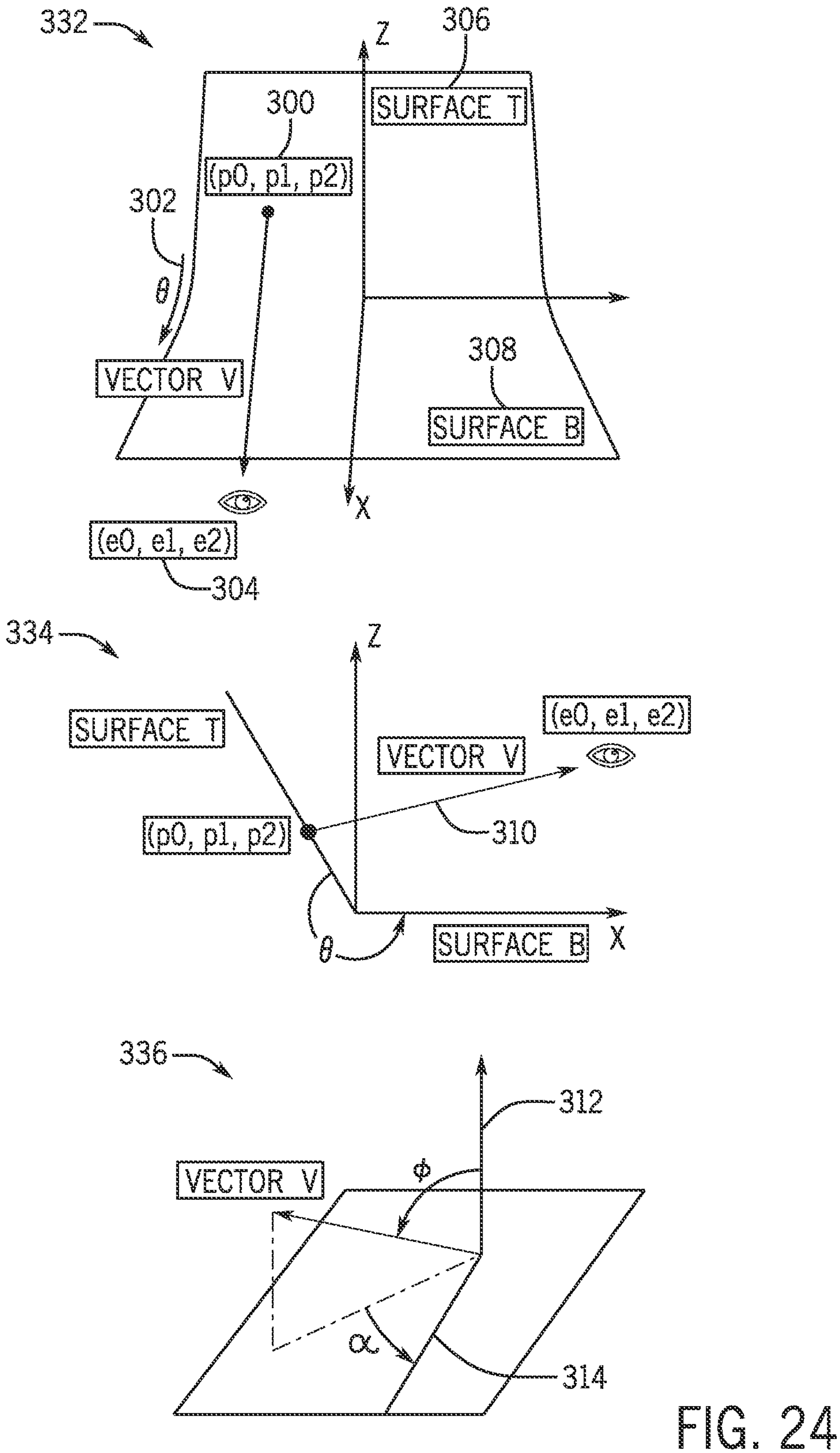
FIG. 24 is a diagram illustrating a coordinate system, in which eye tracking is utilized to perform color and luminance compensation in the foldable display, in accordance with an embodiment.

FIG. 24 is an example of a display coordinate system for a method of automatic color and luminance compensation based on eye position tracking, according to an embodiment of the present disclosure. The display coordinate system includes an illustration of a foldable electronic display coordinate system 332, wherein the display coordinate system 332 includes a top surface of the foldable display (Surface T) 306 and a bottom surface of the display (Surface B) 308. The foldable electronic display coordinate system 332 is shown to use an x, y, z coordinate system to aid in pixel location determination and eye location calculations performed by the system, but any other suitable coordinate system may be used (e.g., polar coordinates, spherical coordinates).

The system may use pixel coordinates stored in a memory of the system and a sensed fold angle 302 of the display to calculate the location of each pixel on the display relative a fold angle of the foldable electronic display 12 and an eye position of user 304. A first pixel coordinate location on the display may be calculated and depicted as $(p_0, p_1, p_2)$ 300; the system may utilize the initial fold angle (θ) 302 in the calculated pixel coordinate. The eye tracking system in the foldable electronic display 12 may determine the eye position of the user. The eye tracking system then transmits the eye position data to the processor of an eye position grid system 334 that calculates the coordinate eye location $(e_0, e_1, e_2)$ 304 for the user. The pixel location relative to eye position along with the fold angle 302 are utilized by the system to calculate a view vector (Vector V) 310 which corresponds to the relationship between a pixel position 300 on the foldable electronic display 12 and the user eye position 304.

The system calculates the corresponding surface direction of each of the pixels on the foldable electronic display 12 using a surface direction grid system 336. For example, the system may calculate the normal direction of the pixels (n0, n1, n2) 312 and the in surface direction (10, 11, 12) 314 of the pixels of the display. The angle between the view vector (Vector V) 310 and the surface normal direction 312 is calculated (ϕ) along with the angle between the view vector 310 and the surface in-surface direction 314 which is calculated (α).

Further, the system may utilize the angle data for each pixel coordinate in relation to surface normal direction 312 and surface in surface direction 314 to establish a 2D α/ϕ map for all pixels on the foldable electronic display 12. The system may calculate the 2D map based on the viewer's eye position 304 and at least some (e.g., all) pixel positions 300 on the foldable electronic display 12. The system then stores the 2D map in memory to be utilized in further calculations.

The system for color and luminance compensation is able to adjust the pixel data with respect to the viewer eye position to generate target RGB pixel luminance for the pixels of the foldable electronic display 12 (e.g., all pixels, a subset of the pixels). The target color and luminance setting for the foldable electronic display 12 is stored in memory and utilized along with each display panels stored performance and 2D map to calculate each pixels corresponding RGB target luminance values. The RGB target luminance values are then sent to the pixels via the DIC of the electronic device so that the device outputs the desired luminance and color based on the user eye position 304.

Figure 25:
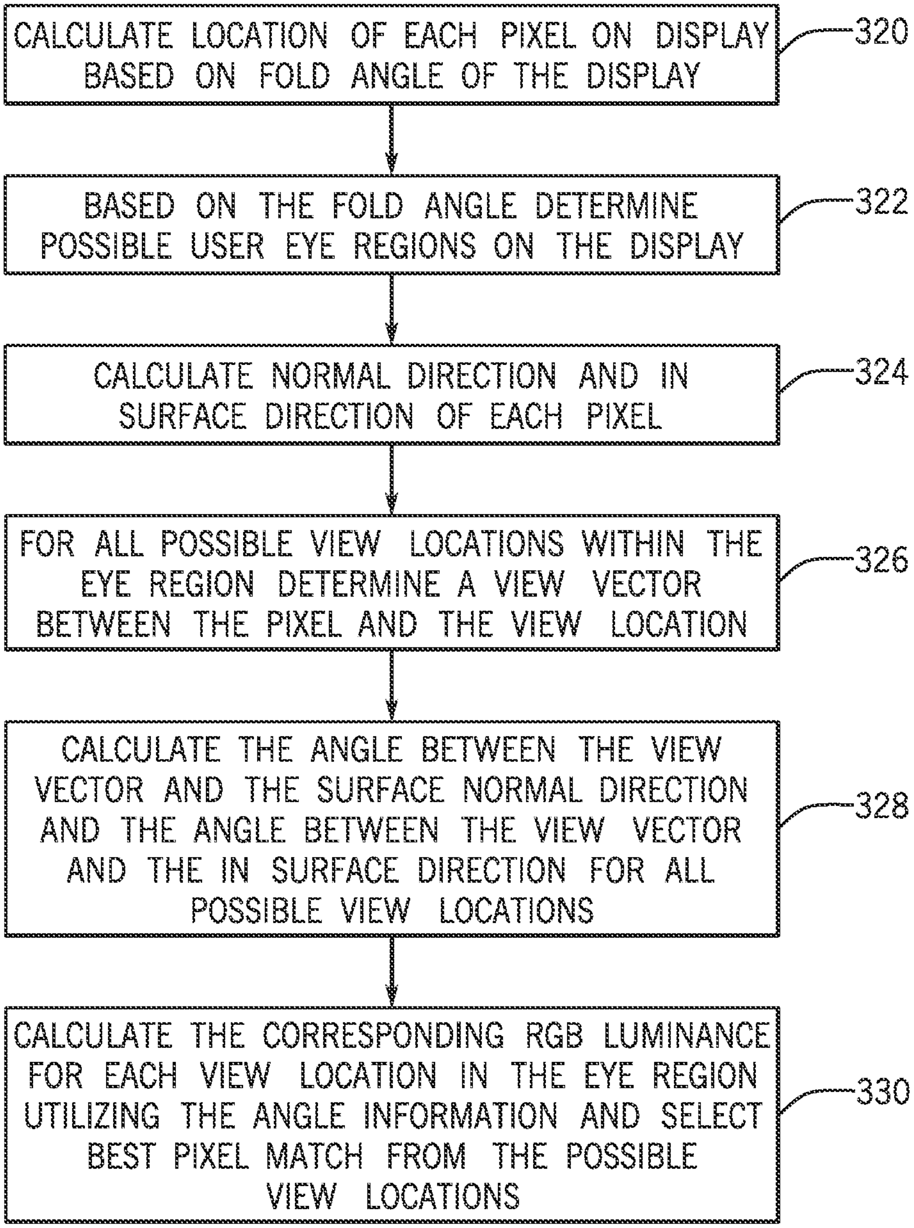
FIG. 25 is a flowchart for a method of automatic luminance and color compensation in the foldable display based on fold angle and estimated eye region, in accordance with an embodiment.

FIG. 25 is a process flow diagram of a method for color and luminance compensation based on fold angle of the foldable electronic display 12. The system first detects the fold angle of the display. The system then determines the location of each pixel on the foldable electronic display 12 based on the detected fold angle of the display (block 320). The system also utilizes the fold angle of the display to determine a set of data corresponding to a possible user eye region (block 322). Possible user eye regions for user eye position corresponding to fold angle of the device are stored in the memory and can be retrieved by the system based on the detected fold angle of the display.

The normal direction of each pixel relative to fold angle is also determined using the system. The normal direction of each pixel is determined according to the top half of the screen and the bottom half of the screen, along with the surface direction of each pixel relative to each respective half the display screen (block 423). The system of the foldable electronic display 12 utilizes the possible user eye region location and the location of the pixels on the foldable electronic display 12 relative to fold angle to calculate possible view locations (e.g., all the possible view locations) within the user eye region between each possible eye position and at least some pixels of the display (e.g., each pixel of the display). The view vector is calculated for each pixel on the foldable electronic display 12 relative to the possible user view locations (block 326). The possible view vectors corresponding to the pixels (e.g., each pixel) are then stored in memory for later calculations corresponding to each pixel.

The collected angle data for each respective pixel of the foldable electronic display 12 may be utilized by the system to determine the angle between the view vector for each respective pixel and the surface normal direction for each respective pixel for each half of the foldable electronic display 12. The angle between each pixel view vector and the surface direction may also calculated for each respective pixel for each half of the display. The respective angles between the view vector and the normal surface and in surface direction for each pixel of the display for possible view locations of the display may be used by the system to develop a 2D map with respect to the pixels and the respective angles for the foldable electronic display 12 (block 328).

The target data for color and luminance for each half of the foldable electronic display 12 based on settings of the display is implemented in combination with the 2D map determined for the display. The corresponding RGB target luminance for all pixels for all possible view locations within the eye region may be calculated. The data may be used to determine the set of best-match target RGB luminance values from all the RGB luminance values determined for all view locations within the eye region. The best-match RGB luminance values are then sent to the pixels of the display panel so that color and luminance compensation is applied to the image displayed on the panel (block 330). This method may be repeated for each fold angle in a multiple fold and/or flexible fold embodiment of the electronic foldable display 12.

Figure 26:
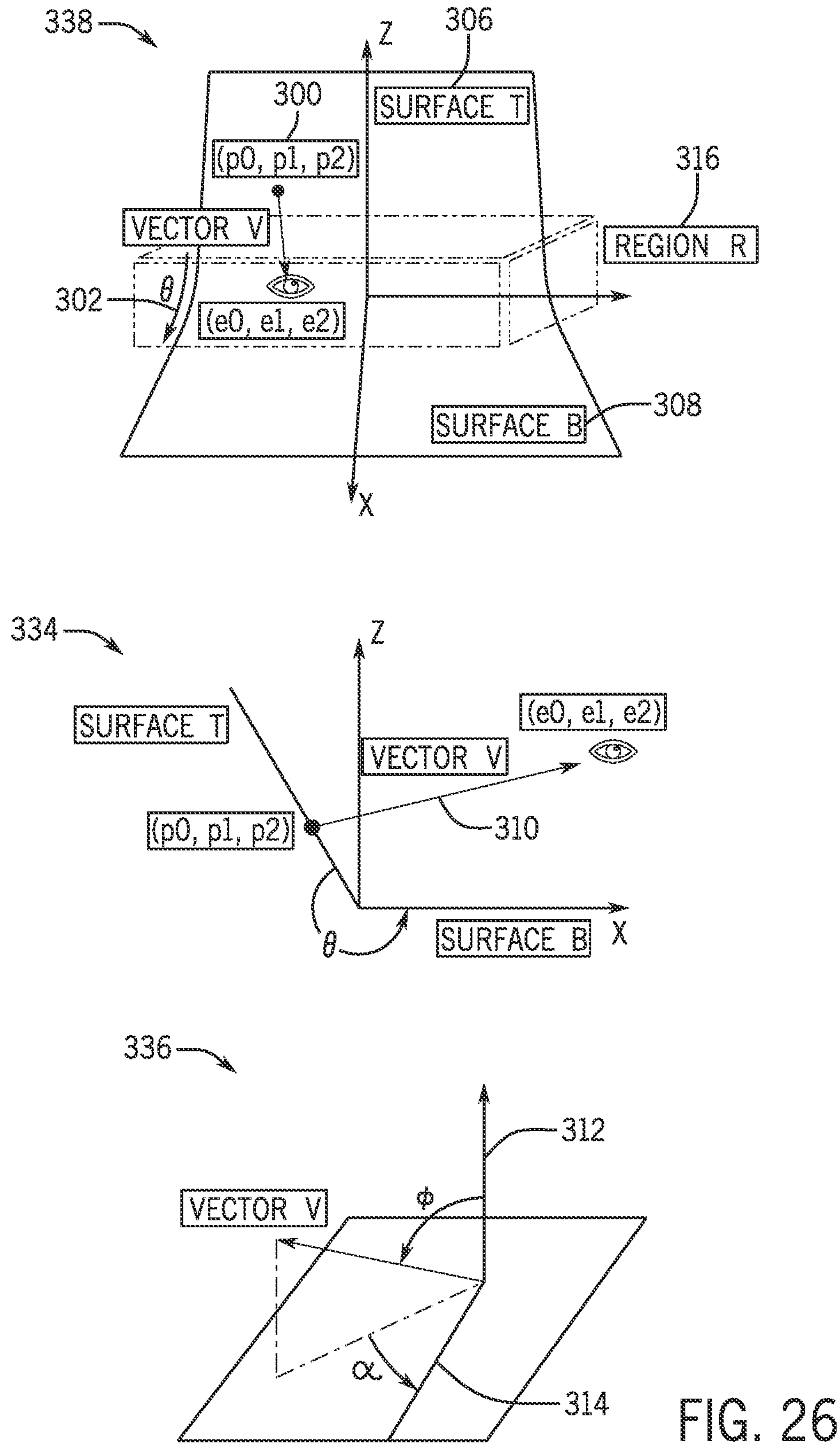
FIG. 26 is a diagram illustrating a coordinate system, in which stored eye regions are utilized to perform color and luminance compensation in the foldable display, in accordance with an embodiment.

FIG. 26 is diagram of a display coordinate system for a method of color and luminance compensation for the foldable electronic display 12. The display coordinate system includes a foldable electronic display 12, wherein the display includes a top surface of the foldable display (Surface T) 306 and a bottom surface of the display (Surface B) 308. The display coordinate system uses an x, y, z coordinate system to aid in pixel and user eye location calculations, but as noted above, other coordinate systems may be used (e.g., polar coordinates, spherical coordinates). The system also includes a memory in which pixel coordinate locations and user eye regions corresponding to fold angles are stored.

The system may calculate the location of each pixel on the foldable electronic display 12 relative to the angle of the folded display, based on stored pixel coordinates and a detected folded angle of the display using an additional foldable electronic display coordinate system 338. For example, a processor of the system may determine a first pixel position ($p_0$, $p_1$, $p_2$) 300 based on fold angle by utilizing an initial fold angle (θ) 302 determined by the processor of the system and a pixel coordinate location retrieved from the memory. This method of determining pixel location based on fold angle may be utilized to determine a location relative to fold angle for many pixel locations (e.g., every pixel location, locations of regions of groups of pixels).

The processor of the system may determine a possible user eye region (Region R) 316 wherein the eye location of the user may be located, based on the fold angle 302 of the display and possible user eye regions based on fold angle which are stored in a memory of the foldable electronic display 12, using an eye region grid system 334. The Region R 316 fetched from the memory is implemented by the system and enables a possible eye position in the Region R 316 to be calculated ($e_0$, $e_1$, $e_2$) 304 by the system. The pixel location relative to the calculated eye position within the Region R 316 along with the determined fold angle may be utilized by the system to enable a processor of the system to calculate a view vector (Vector V) 310 which represents the relationship between a pixel location on the foldable electronic display 12 and the calculated eye position.

Further, the system may calculate the corresponding surface direction of each of the pixels on the foldable electronic display 12, using a surface direction grid system 336. The system calculates the normal direction of the pixels ($n_0$, $n_1$, $n_2$) 312 and the in surface direction ($i_0$, $i_1$, $i_2$) 314 of the pixels on the foldable electronic display 12. The angle between the view vector (Vector V) 310 and the surface normal direction 312 is calculated (ϕ) along with the angle between the view vector 310 and the surface in-surface direction 314 (α).

For the possible view locations within the Region R 316, the system may utilize the angle data for each pixel coordinate in relation to surface normal direction 312 and surface in surface direction 314 to establish a 2D α/ϕ map for all pixels on the foldable electronic display 12. The system is able to calculate the 2D map based on a number of possible view locations ($e_0$, $e_1$, $e_2$) (e.g., all possible view locations) and some number of pixel positions 300 (e.g., all pixel positions 300) on the foldable electronic display 12.

Based on the 2D map, the system may adjust the pixel data accordingly with respect to all the possible eye positions within the Region R 316. The target color and luminance of the foldable electronic display 12 may be utilized along with the display panel's 2D map to calculate possible view locations and corresponding RGB target luminance values within the Region R 316. From the RGB target luminance determined for all possible view locations, the system selects the best-match target RGB luminance to implement. The RGB target luminance values are then sent to the pixels via the DIC of the electronic device so that the device outputs the desired color and luminance based on the user eye position.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic display device, comprising:
- an electronic display panel comprising a plurality of pixels; and
- driver integrated circuitry configured to:
  - receive image data comprising data for a first part of an image corresponding to a first part of the electronic display panel and a second part of the image corresponding to a second part of the electronic display panel configured to be displayed via the plurality of pixels;
  - scale a first set of gray level data for the first part of the image based on a first look up table (LUT);
  - adjust the image data for the first part of the image to the first set of scaled gray level data based on a first display brightness value (DBV) corresponding to a first brightness setting for the first part of the image;
  - scale a second set of gray level data for the second part of the image based on a second LUT;
  - adjust the image data for the second part of the image to the second set of scaled gray level data based on a second DBV corresponding to a second brightness setting different from the first brightness setting for the second part of the image;
  - using a gamma digital-to-analog converter that receives the first set of scaled gray level data and the second set of scaled gray level data, generate programming signals based on the first set of scaled gray level data and the second set of scaled gray level data to send to the electronic display panel; and
  - using a source amplifier, driving a first set of the programming signals based on the first set of scaled gray level data to the first part of the electronic display panel and driving a second set of the programming signals based on the second set of scaled gray level data to the second part of the electronic display panel.

2. The electronic display device of claim 1, wherein the electronic display panel is configured to be folded in half to produce a top half and a bottom half in different planes with respect to one another, and wherein the first part of the image corresponds to the top half and wherein the second part of the image corresponds to the bottom half.

3. The electronic display device of claim 2, wherein the first brightness setting for the top half is brighter than the second brightness setting for the bottom half.

4. The electronic display device of claim 1, wherein the driver integrated circuitry is configured to store the data for the first part of the image in a first gray buffer and store the data for the second part of the image in a second gray buffer.

5. An electronic electronic display comprising:
- an electronic display panel that, when folded, comprises a first part in a first plane and a second part in a second plane different from the first plane; and
- display driver integrated circuitry comprising:
  - a first look up table (LUT) configured to scale a first set of input gray values for the first part of the electronic display panel;
  - a second LUT configured to scale a second set of input gray values for the second part of the electronic display panel;
  - a gamma digital-to-analog converter configured to receive the scaled first set of input gray values and the scaled second set of input gray values and generate programming signals for the first part of the electronic display panel and the second part of the electronic display panel based on the scaled first set of input gray values and the scaled second set of input gray values; and
  - a source amplifier configured to drive:
    - a first set of the programming signals based on the first set of scaled gray level data to the first part of the electronic display panel; and
    - a second set of the programming signals based on the second set of scaled gray level data to the second part of the electronic display panel.

6. The electronic display of claim 5, wherein, for a same first gray level, the gamma digital-to-analog converter is configured to generate a first programming signal that causes a pixel in the first part of the electronic display panel to emit light of a first brightness, to generate a second programming signal that causes a pixel in the second part of the electronic display panel to emit light of a second brightness different from the first brightness, or both.

7. The electronic display of claim 5, wherein the gamma digital-to-analog converter is configured to receive a first set of one or more reference signals corresponding to a first brightness setting for the first part of the electronic display panel and a second set of one or more reference signals corresponding to a second brightness setting for the second part of the electronic display panel, wherein the first brightness setting is different from the second brightness setting.

8. The electronic display of claim 7, comprising a first gamma reference circuit configured to generate the first set of the one or more reference signals based on the first brightness setting and a second gamma reference circuit configured to generate the second set of the one or more reference signals based on the second brightness setting, wherein the first gamma reference circuit and the second gamma reference circuit are both disposed on a first printed circuit board.

9. The electronic display of claim 7, comprising a first gamma reference circuit configured to generate the first set of the one or more reference signals based on the first brightness setting and a second gamma reference circuit configured to generate the second set of the one or more reference signals based on the second brightness setting, wherein the first gamma reference circuit is disposed on a first printed circuit board associated with the first part of the electronic display panel and the second gamma reference circuit is disposed on a second printed circuit board associated with the second part of the electronic display panel.

10. An electronic device comprising:
- a processor configured to generate image data; and
- an electronic display that, when folded, comprises a first part in a first plane and a second part in a second plane different from the first plane, wherein a brightness setting of the first part is configured to be controlled independently of a brightness setting of the second part, wherein the electronic display comprises driving integrated circuitry comprising:
  - a first look up table (LUT) configured to scale a first set of input gray values for the first part in the first plane based on the brightness setting of the first part;
  - a second LUT configured to scale a second set of input gray values for the second part in the second plane based on the brightness setting of the second part;
  - a gamma digital to analog converter configured to receive the first set of scaled gray values from the first LUT and the second set of scaled gray values from the second LUT and generate programming signals based on the first set of scaled gray values and the second set of scaled gray values; and
  - a source amplifier configured to drive:
    - a first set of the programming signals based on the first set of scaled gray level data to the first part; and
    - a second set of the programming signals based on the second set of scaled gray level data to the second part.

11. The electronic device of claim 10, wherein the processor is configured to generate the image data to contain first image content at a higher brightness setting for the first part of the electronic display and second image content at a lower brightness setting for the second part of the electronic display.

12. The electronic device of claim 11, wherein the first image content comprises main image content and the second image content comprises image content descriptive of an input device.

13. The electronic device of claim 12, wherein the input device comprises a keyboard or a trackpad or both.

14. The electronic device of claim 10, wherein the electronic display is configured to control the brightness setting of the first part independently of the brightness setting of the second part at least in part by adjusting a first pulse width modulation width of a first emission signal for the first part independently of adjusting a second pulse width modulation width of a second emission signal for the second part.

15. The electronic device of claim 10, wherein the electronic display is configured to control the brightness setting of the first part independently of the brightness setting of the second part at least in part by scaling a first emission clock signal for the first part independently of scaling a second emission clock signal for the second part.

16. A method comprising:
- receiving a frame of image data comprising image data for a first part of an image configured to be displayed on a first part of an electronic display and image data for a second part of the image configured to be displayed on a second part of the electronic display;
- converting the image data for the first part of the image to a first set of scaled gray level data via a first look up table (LUT) based on a first mode flag corresponding to a first color correction setting corresponding to the first part of the electronic display, wherein the first mode flag comprises a first display brightness value;
- converting the image data for the second part of the image to a second set of scaled gray level data via a second LUT based on a second mode flag corresponding to a second color correction setting different from the first color correction setting corresponding to the second part of the electronic display, wherein the second mode flag comprises a second display brightness value; and
- sending the first set of scaled gray level data and the second set of scaled gray level data to the electronic display.

17. The method of claim 16, wherein the first color correction setting is configured to cause a blue light setting of the first part of the electronic display to decrease.

18. The method of claim 16, wherein the first color correction setting is configured to cause a white point of the first part of the electronic display to more closely match environmental lighting conditions.

19. The method of claim 16, wherein a brightness setting of the first part is controlled independently of a brightness setting of the second part.

20. A method comprising:
- receiving a frame of image data comprising image data for a first part of an image configured to be displayed on a first part of an electronic display and image data for a second part of the image configured to be displayed on a second part of the electronic display;
- converting the image data for the first part of the image to a first set of scaled gray level data via a first look up table (LUT) based on a first mode flag corresponding to a first color correction setting corresponding to the first part of the electronic display by applying the first mode flag to adjust a first white balance for the first part of the electronic display;
- converting the image data for the second part of the image to a second set of scaled gray level data via a second LUT based on a second mode flag corresponding to a second color correction setting different from the first color correction setting corresponding to the second part of the electronic display by applying the second mode flag to adjust a second white balance for the second part of the electronic display; and
- sending the first set of scaled gray level data and the second set of scaled gray level data to the electronic display.

21. The method of claim 20, wherein the image data for the first part of the image is received via a first buffer and the image data for the second part of the image is received via a second buffer.

22. The method of claim 20, wherein the first color correction setting is configured to cause a blue light setting of the first part of the electronic display to decrease.

23. The method of claim 20, wherein the first color correction setting is configured to cause a white point of the first part of the electronic display to more closely match environmental lighting conditions.

* * * * *